US009055413B2

(12) United States Patent
Rosener

(10) Patent No.: US 9,055,413 B2
(45) Date of Patent: Jun. 9, 2015

(54) PRESENCE OVER EXISTING CELLULAR AND LAND-LINE TELEPHONE NETWORKS

(75) Inventor: Doug Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 2411 days.

(21) Appl. No.: 11/895,055

(22) Filed: Aug. 22, 2007

(65) Prior Publication Data
US 2008/0299948 A1 Dec. 4, 2008

Related U.S. Application Data

(63) Continuation-in-part of application No. 11/697,087, filed on Apr. 5, 2007.

(60) Provisional application No. 60/864,583, filed on Nov. 6, 2006.

(51) Int. Cl.
| | |
|---|---|
| *H04W 24/00* | (2009.01) |
| *H04M 3/493* | (2006.01) |
| *H04W 4/12* | (2009.01) |
| *H04M 1/60* | (2006.01) |
| *H04L 29/08* | (2006.01) |

(52) U.S. Cl.
CPC .............. *H04W 4/12* (2013.01); *H04M 1/6066* (2013.01); *H04L 67/2842* (2013.01)

(58) Field of Classification Search
USPC ............. 455/456.1–456.6, 413, 412.1, 412.2, 455/414.1, 421, 426.1, 426.2, 457, 458, 455/41.2, 513, 554.1, 554.2, 566, 567, 455/151.2, 462, 465; 379/220.01, 379/221.01–221.15, 224–229, 379/420.01–420.04, 421–427, 379/428.01–428.04, 429–431, 379/433.01–433.13
See application file for complete search history.

(56) References Cited

U.S. PATENT DOCUMENTS

| | | | | |
|---|---|---|---|---|
| 5,745,850 | A | * | 4/1998 | Aldermeshian et al. ....... 455/417 |
| 6,044,267 | A | * | 3/2000 | Foladare et al. ........... 455/426.1 |
| 6,766,175 | B2 | * | 7/2004 | Uchiyama ..................... 455/462 |
| 7,099,453 | B2 | * | 8/2006 | Crockett et al. ......... 379/220.01 |
| 2002/0049079 | A1 | * | 4/2002 | Buckley et al. ............... 455/568 |
| 2003/0206619 | A1 | * | 11/2003 | Curbow et al. .......... 379/210.01 |
| 2005/0000469 | A1 | * | 1/2005 | Giunta et al. ................. 119/721 |
| 2006/0072591 | A1 | | 4/2006 | Rogalski |
| 2006/0246881 | A1 | * | 11/2006 | Winkler et al. ............... 455/415 |
| 2008/0116849 | A1 | * | 5/2008 | Johnston ....................... 320/114 |

FOREIGN PATENT DOCUMENTS

| | | |
|---|---|---|
| EP | 1185058 A | 3/2002 |
| EP | 1571810 A | 9/2005 |
| JP | 2004282154 A | 10/2004 |

OTHER PUBLICATIONS

International Search Report related to PCT/US2008/074126, mailed Oct. 23, 2008.

(Continued)

*Primary Examiner* — San Htun
(74) *Attorney, Agent, or Firm* — Chuang Intellectual Property Law

(57) ABSTRACT

Presence information is received and processed at a base station from one or more wireless headsets or wireless telephones. The base station is coupled to a PSTN network or cellular network. The base station outputs a plurality of caller selectable options associated with the plurality of presence information to a far end caller and receives a far end caller selected option.

31 Claims, 28 Drawing Sheets

(56) References Cited

OTHER PUBLICATIONS

Written Opinion of the International Searching Authority related to PCT/US2008/074126, mailed Oct. 23, 2008.

Gregory, Peter; Doria, Tom; Stegh, Chris; Su, Jim; SIP Communications for Dummies, Avaya Custom Edition, 2006, Wiley Publishing, Inc., Hoboken, NJ, USA.

* cited by examiner

PRESENCE OVER EXISTING CELLULAR AND LAND-LINE TELEPHONE NETWORKS

RELATED APPLICATIONS

The present application is a continuation-in-part application of U.S. patent application Ser. No. 11/697,087 for "Headset-Derived Real-Time Presence and Communication Systems and Methods" filed on Apr. 5, 2007, which claims priority to Provisional Application Ser. No. 60/864,583 for "Headset-Derived Real-Time Presence and Communication Systems and Methods" filed on Nov. 6, 2006, the entire disclosures of which are incorporated herein by reference for all purposes.

BACKGROUND OF THE INVENTION

Generally, "presence" is the concept of providing others with information about a user's ability or willingness to communicate. In the prior art, the concept of using presence in communication systems is often applied in instant messaging systems. Presence is also used in other network communication systems, such as the Microsoft Unified Communication Service. However, these prior art systems rely on a connection to a computer network to deliver presence information.

In many situations, a caller attempts to call someone using the standard public switched telephone network or a cellular network. In the prior art, such a caller has only limited information about who is available to take a call, or their willingness to take it. The caller may not have the proper equipment to connect to a network presence server, or a network presence server may not be available, or the person being called may not have a connection to a computer network to take advantage of networked presence servers. Currently, when a caller makes a call over a cellular or landline telephone network, either the call is answered by somebody, the line is busy, no one answers the call, or an answering machine/voice mail answers the call.

As a result, there is a need for improved methods and apparatuses for delivery of presence information over cellular and landline telephone networks.

BRIEF DESCRIPTION OF THE DRAWINGS

The present invention will be readily understood by the following detailed description in conjunction with the accompanying drawings, wherein like reference numerals designate like structural elements.

FIGS. 16 and 17B are a flowchart illustrating an exemplary process by which the system in FIG. 12A operates to gather and deliver presence information over a public switched telephone network (PSTN), in accordance with an embodiment of the present invention.

DESCRIPTION OF SPECIFIC EMBODIMENTS

Figure 1:
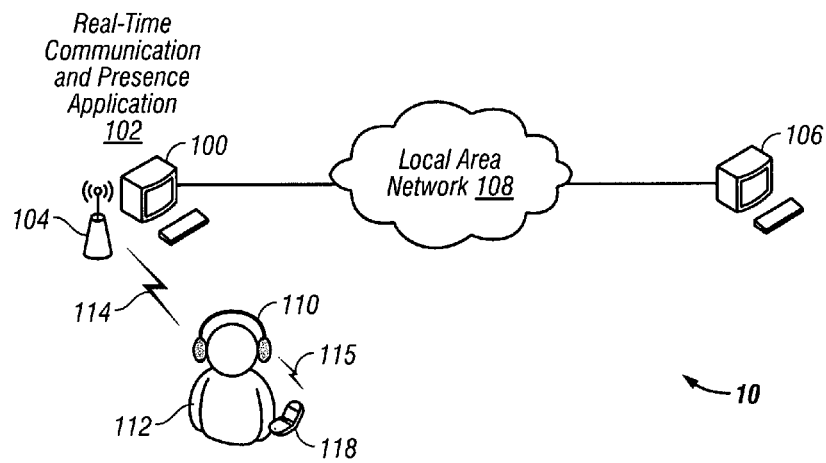
FIG. 1 is a diagram of a headset-derived presence and communication system, according to an embodiment of the present invention, in which real-time communications between users is performed over a local area network (LAN)

Methods and apparatuses for delivery of presence information over cellular and landline telephone networks are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The invention relates to the general field of presence and wireless communications devices such as headsets and handsets. In one example, this description describes a method and apparatus for providing presence information over existing cellular or landline telephone networks. Presence information is provided to a local base station, which operates as a presence server to provide the presence information in an audio format to a caller. The base station is controllable by the caller using DTMF tones. Typical presence information may include, for example, whether the user is wearing their headset, whether the user is near the base station, and whether the user desires to be called. A security code may be utilized in case it is desired to only pass presence information to select callers.

For example, a caller connects to a modified PSTN base station in a home using a land-line or cell phone. Instead of ringing the entire house, the base station answers the call and provides voice prompts to the user. The caller can query the base station for presence information using DTMF button presses on the caller's phone. Presence information is received from various cordless phones or headsets that members of the household wear. After the caller hears the people available, the caller chooses the person he wants using an additional DTMF button press.

Presence information can also be delivered using just a cell phone or landline phone and headset. In this example, the phone acts as the presence server and gives information about the headset status and proximity of the user to the phone. This is particularly desirable for frequent instant text messaging users. In this manner, users do not send text messages that they know will not be read. In a further example, the presence information is sent to the caller using text messaging in addition to voice audio.

The herein described methods and systems provide several advantages over the prior art. Presence information is delivered over existing cellular or landline telephone networks. It allows presence to be delivered in situations where the technology available to the caller is lower than the technology available to the person being called. It also allows a caller to establish the status of a person being called without disturbing the person. For example, for a caller wishing to determine the status of an elderly person, presence information as well as medical status can all be presented to an interested caller without constraining or disturbing the elderly person. In another example, members of a household are not disturbed by frequent calls to a single family member.

In one example of the invention, a method of reporting headset presence characteristics over a PSTN communications network includes receiving and processing at a base station a plurality of presence information from one or more wireless headsets or wireless telephones, where the base station is coupled to a PSTN network. A telephone call is received at the base station over the PSTN network from a far end caller. A plurality of caller selectable options associated with the plurality of presence information is output from the base station to the far end caller. A far end caller selected option is then received.

In one example of the invention, a communication system includes one or more wireless headsets or wireless telephones and a telephone base coupled to a PSTN network. The telephone base includes a presence monitoring program adapted to receive and process presence information associated with the one or more wireless headsets or wireless telephones. The telephone base also includes a caller interaction program for communicating a plurality of user selectable options associated with the presence information to a far end caller over the PSTN network, and responsively receiving and processing a far end caller selected option.

In one example of the invention, a method of reporting headset presence characteristics over a cellular communications network includes receiving and processing at a computing device a plurality of presence information from a wireless headset and the computing device, where the computing device is in a cellular communications network. The method further includes receiving a telephone call at the computing device over the cellular communications network from a far end caller. The method further includes outputting from the computing device a plurality of user selectable options associated with the plurality of presence information to the far end caller, and receiving a user selected option from the far end caller.

In one example of the invention, a presence delivery system includes a wireless headset having a first detector or sensor for gathering a first plurality of presence information associated with the wireless headset. The presence delivery system also includes a computing device having a first transceiver for wireless communications with the wireless headset, a second transceiver for wireless communications with a cellular communications network, and a second detector or sensor for gathering a second plurality of presence information associated with the computing device. The computing device also includes a presence monitoring program adapted to receive and process the first plurality of presence information associated with the wireless headset and the second plurality of presence information associated with the computing device. The computing device further includes a caller interaction program for communicating a plurality of user selectable options associated with the first plurality of presence information and the second plurality of presence information to a far end caller over the cellular communications network, and responsively receiving and processing a far end caller selected option.

In one example of the invention, a communication system includes one or more wireless headsets or wireless telephones, and a presence server coupled to a PSTN network. The presence server includes a presence monitoring program adapted to receive and process presence information associated with the one or more wireless headsets or wireless telephones. The presence server also includes a caller interaction program for communicating a plurality of user selectable options associated with the presence information to a far end caller over the PSTN network and responsively receiving and processing a far end caller selected option.

In one example of the invention, a method of reporting headset presence characteristics over a PSTN or cellular communications network includes determining a headset usage state, generating presence information from the headset usage state, reporting the presence information to a presence server, and providing the presence information to a far end caller connected to the presence server via a PSTN or cellular network.

Headset derived presence and communication systems and methods are disclosed. A headset-derived presence and real-time communication system may include a client computer, a presence server, a headset and an optional text-to-speech converter. The client computer may contain a real-time communications and presence application client. The headset may be adapted to provide proximity and usage information of the headset to the client computer and real-time communications and presence application client over a wired or wireless link. The presence server may be coupled to the client computer, e.g., by way of a computer network, and may be adapted to manage and update a proximity and usage record of the headset, based on the proximity and usage information provided by the headset.

In a first aspect, a headset-derived presence and communication system may include a wireless headset and a computing device having a real-time messaging program installed thereon coupled and wirelessly coupled thereto. The computing device and real-time messaging program may be adapted to receive and process headset usage characteristics of the wireless headset. The real-time messaging program may be an instant messaging (IM) program, and/or a Voice Over Internet Protocol (VoIP) program. The computing device and real-time messaging program may receive and process proximity information characterizing a proximity of the headset to the computing device which may be determined by measuring strengths of signals received by the headset or by the computing device. The headset may includes an accelerometer operable to measure the proximity information. The proximity information may also be determined using radio frequency identification (RFID). The wireless headset may include a detector or sensor operable to determine whether the headset is being worn on the head of a user and/or means may be provided for determining whether a user has shifted from using the headset to communicate to using an alternate mode of communicating.

The computing device may be a mobile computing device and may be configured within a computer network. Means may be provided for reporting presence information of a first user associated with the headset to other real-time messaging users based on received headset usage characteristics. A subsystem may be provided for signaling a user associated with the wireless headset that a real-time message has been received by the computing device. A converter may be provided for converting a text-formatted real-time message received from a first user to a speech-formatted real-time message and/or for sending the speech-formatted real-time message to a user associated with the headset. The converter may convert voice signals of the headset user associated to text-formatted real-time messages and send the formatted messages to another user.

In another aspect, a wireless headset may include at least one headphone and a wireless receiver coupled thereto and configured to receive a signal over a wireless link from a computing device or system adapted to execute a real-time messaging system. The signal may indicate that a real-time message has been received by the computing device or system. A detector or sensor in the headset may be configured to collect data characterizing proximity of the headset relative to the computing device or system. One or more such detectors or sensors may be operable to determine whether the headset is being carried or has been put on or donned by a user. A transducer in the headset may be configured to receive the signal and generate a user-sensible signal that notifies the headset user that the real-time message has been received by the computing device or system.

The real-time messaging system may be a text-based instant messaging system and the message may be a text-based instant message. A text-to-speech converter may be operable to convert the text-based instant message to a speech-based signal, and the wireless receiver of the headset may be adapted to receive the speech-based signals and to generate audible or acoustic signals for the headset user. The real-time messaging system may be a Voice Over Internet Protocol (VoIP) system and the headset may be adapted to receive VoIP messages over a wireless link from the computing device or system. A shift detector may be provided for determining whether a user has shifted from communicating with the computing device or system by using the headset to communicate using some other mode of communication by, for example, communicating using a mobile device. The computing device may be a mobile computing device.

In another aspect, a method of reporting headset usage characteristics of a wireless headset to a first computing device or system adapted to receive real-time messages from a second computing device system may include determining whether the wireless headset is within range of a base station coupled to the computing device or system and/or is within range of an access point configured to communicate with the first computing device or system, determining a headset usage characteristic and reporting the determined headset usage characteristic to the base station or access point. The reported headset usage characteristic may be used to generate a headset usage record which indicates whether the headset is donned or not donned by the user. Presence information may be generated or sent to the second computing device or system based on the headset usage record prior to, after or during a time when a real-time message is received by the first computing device or system from the second computing device or system. Whether the user has shifted from communicating using the wireless headset to an alternate mode of communicating may be determined. A headset usage record may be generated in the first computing device system indicating that the user has shifted from communicating using the wireless headset to the alternate mode of communicating, if it is determined that the user has shifted to the alternate mode of communicating for example the use of a mobile device that communicates over a cellular or other wired or wireless network.

Sending presence information to the second computing device or system may be based on the headset usage record by, for example, converting a signal generated by the alternate mode of communicating to data packets with a compatible protocol communicated over a packet-switched network to the first computing device or system and generating the headset usage record using the data packets. A real-time message communicated from the second computing device or system to the first computing device or system may be a text-based instant message (IM) which may be converted to a speech-based acoustic signal for the headset user and/or may be a Voice Over Internet Protocol (VoIP) message. A user-sensible headset signal may be generated in response to the first computing device or system receiving a real-time message from the second computing device system and the first computing device may be a mobile computing device. Access to the first computing device or system may be unlocked if it is determined that the wireless headset is within range of a base station coupled to the first computing device or system or within range of an access point configured to communicate with the first computing device system.

In another aspect, a method of communicating in real-time may include determining a usage state of a communication headset associated with a first real-time messaging member, generating presence information using the determined usage state and communicating the presence information to other real-time messaging members. The determined usage state may be communicated to a computing device associated with the communication headset and may include an indication whether the communication headset is donned or is not donned by the first real-time messaging member and/or whether the communications headset is being carried by the first real-time messaging member and/or whether the communication headset is plugged into a charging cradle and/or whether the communication headset is not being used by the first real-time messaging member and/or is not readily accessible by the first real-time messaging member and/or whether the first real-time messaging member has shifted from using the communication headset to communicate to using an alternate mode of communicating, such as by using a mobile device.

The proximity of the communication headset to a computing device configured to communicate with the communication headset may be determined by using the determined proximity to generate the presence information. A signal characterizing the usage state may be transmitted to a computing device or system adapted to communicate in a real-time messaging system over at least one wired or wireless network which may be a cellular telephone network and/or a packet-switched network and/or IEEE 802.11 or 802.16 network or over a wireless link, such as a Bluetooth link. The computing device may be a mobile computing device. A user-sensible headset signal may be generated when the real-time messaging member receives a real-time message from one of the other real-time messaging members. The real-time message may be a text-formatted message or a voice-formatted message converted from a text-based message and/or a Voice Over Internet Protocol (VoIP) message.

In a further aspect, a computer-readable storage medium containing instructions for controlling a computer system to generate presence information based on one or more usage states of a communication headset may include receiving usage data characterizing the use of a communication headset by a real-time messaging user associated with the headset. The usage data may be used to generate presence information in a real-time messaging system such as whether the real-time messaging user associated with the headset is carrying or donning the communication headset and/or has shifted from using the communication headset to an alternate mode of communicating, such as by using a mobile device. The real-time messaging system may be an instant messaging (IM) system or a Voice Over Internet Protocol (VoIP) system.

In a still further aspect, a headset-derived presence and real-time messaging communication system may include a computing device, having a real-time messaging application program installed thereon, and adapted to receive usage information of a communication headset associated with a real-time messaging user and a presence server coupled to the computing device and adapted to manage and update a usage record of the communication headset based on usage information provided by the communication headset. The usage information may characterize whether the communication headset is donned or being carried by the real-time messaging user and/or whether the real-time messaging user has shifted from communicating using the headset to using an alternate mode of communicating. A proximity detector may determine proximity of the headset to the computing device. The presence server may be operable to provide presence information of the user to other real-time messaging users based on the usage record. A text-to-speech converter may be operable to convert text-formatted real-time messages to speech-formatted messages which may be transmitted to the communication headset over a wired or wireless link.

According to one exemplary embodiment, a headset-derived presence and real-time communication system includes a client computer, a presence server, an intelligent headset, and an optional text-to-speech converter. The client computer (e.g., a personal computer (PC) or mobile computing device such as a smart phone) contains a real-time communication (e.g., IM or VoIP) and presence application client. The intelligent headset is adapted to provide proximity and usage information of the headset to the client computer or mobile computing device and the real-time communication and presence application client over a wireless or wired link. The presence server is coupled to the client computer or mobile computing device (e.g., by way of a computer network), and is adapted to manage and update a proximity and usage record of the headset based on the proximity and usage information provided by the headset.

The proximity and usage record of the intelligent headset includes, but is not necessarily limited to: the proximity (e.g., location or connection state) of the headset to the client computer; whether the headset is turned on or off, whether the headset is donned by a user, whether the headset is being carried by the user; whether the headset is simply sitting on a desk or other surface; whether the user has "shifted presence" (i.e., whether the user has shifted from communicating using the headset to using an alternate mode of communicating (e.g., to use a mobile device such as a cell phone)), whether the headset is not being used by the user or is not readily accessible by the user; and whether the headset is plugged into a charging cradle or adapter. As will be explained in detail below, the proximity and usage record on the presence server is updated manually or automatically through the real-time communication and presence application client on the client computer when the proximity and/or usage state of the headset changes.

The proximity and usage state record may be used to determine the most appropriate mode for a real-time messaging user to initiate a real-time communication session with a user associated with the headset. If the proximity and usage record indicates that the user is using, carrying, donning or may have access to the headset, the system sends a user-sensible signal to the headset, in response to a real-time message received by the system. If the real-time communication comprises an IM in text form, the IM may be converted to speech using an optional text-to-speech converter. The system then transmits the real-time communication or speech converted IM over a wired or wireless link to the headset, so that the headset user may listen to the real-time communication or speech-converted IM. If the proximity and usage record indicates that the user associated with the headset has shifted from communicating using the headset to using an alternate mode of communicating, the system informs other real-time communication users that the user associated with the headset is not available for real-time messaging at the client computer, but that the user may be reached using the alternate mode of communicating.

Referring now to FIG. 1, there is shown a headset-derived presence and communication system 10, in accordance with an embodiment of the present invention. While the term "presence" has various meanings and connotations, the term "presence" is used herein to refer to a user's willingness, availability and/or unavailability to participate in real-time communications and/or means by which the user is currently capable or incapable of engaging in real-time communications.

The headset-derived presence and communication system 10 comprises a first computer 100 having a real-time communication (e.g., instant messaging (IM) and presence application 102 installed thereon, a base station (BS) 104 coupled to the first computer 100, a second computer 106 having a real-time communication (e.g., other instance of the real-time communication and presence application 102) installed thereon, and an intelligent headset 110 adapted to be worn by a user 112. For purposes of this disclosure, the term "headset" is meant to include either a single headphone (i.e., monaural headset) or a pair of headphones (i.e., binaural headset), which include or do not include, depending on the application and/or user-preference, a microphone that enables two-way communication.

Figure 2:
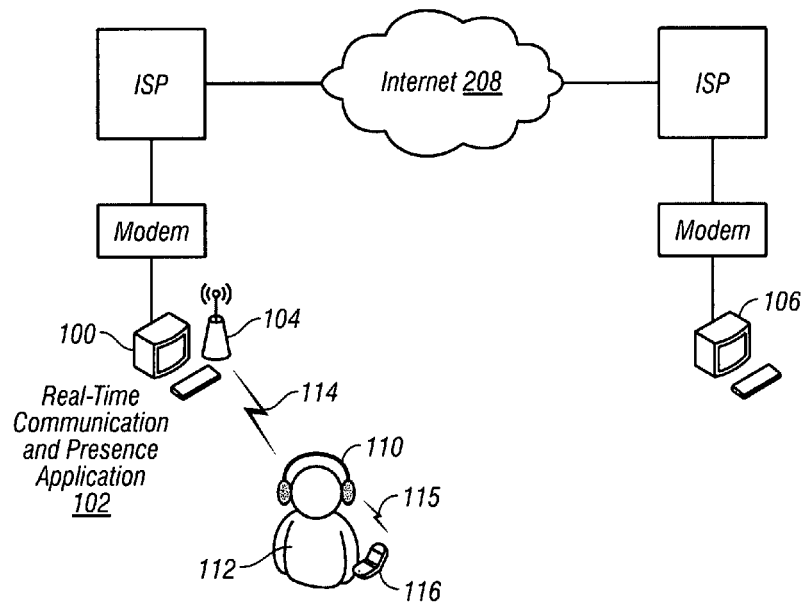
FIG. 2 is a diagram of a headset-derived presence and communication system, according to an embodiment of the present invention, in which real-time communications between users is performed over a wide area network (WAN) such as, for example, the Internet.

The real-time communication and presence application 102 on the first computer 100 is configured to receive real-time communications (e.g., IMs) from, and send instant messages to, the second computer 106 over a communication network. According to one aspect of the invention, as shown in FIG. 1, the network comprises a local area network (LAN) 108 such as, for example, a business enterprise network. According to another embodiment, as shown in FIG. 2, the network comprises a wide area network (WAN) such as, for example, the Internet 208.

According to one embodiment of the invention, the intelligent headset 110 comprises a wireless headset that includes an RF transceiver which is operable to communicate proximity and usage information of the intelligent headset 110 back to the BS 104 via a first wireless link (e.g., a Bluetooth link or a Wi-Fi (IEEE 802.11) link) 114. A second RF transceiver may also be configured within the headset 110 to communicate over a second wireless link (e.g., a second Bluetooth link) 115 with a mobile device 116 (e.g., a cell phone) being carried by the user 112.

Figure 3:
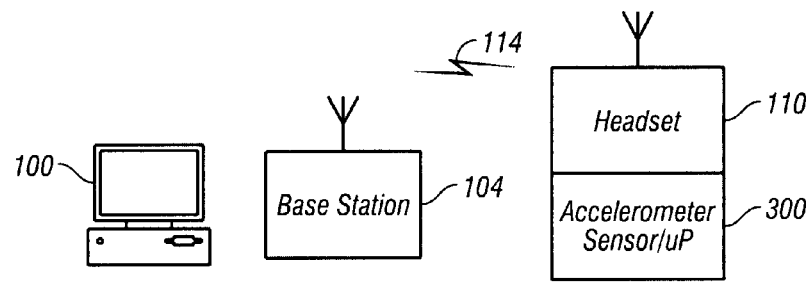
FIG. 3 is a drawing illustrating how a linear accelerometer tri-axis angular rate sensor and associated microprocessor or microcontroller may be employed to determine proximity of an intelligent headset to a wireless base station, in accordance with an aspect of the present invention.

Proximity of the intelligent headset 110 relative to the BS 104 can be performed in various ways. For example, as shown in FIG. 3, the headset 110 may be configured to include a tri-axis linear accelerometer and/or tri-axis angular rate sensor 300 controlled by a microcontroller or microprocessor. The tri-axis linear accelerometer and/or tri-axis angular rate sensor 300 are configured to operate as an inertial navigation system (INS), which provides proximity or location information of the headset 110 relative to the BS 104. The rate sensor provides information concerning the orientation of the headset 110 with respect to its inertial frame, and the accelerometer provides information about accelerations of the inertial frame itself. In particular, as the orientation of the headset 110 changes, the accelerometer detects changes due to gravity acting on the different axes. By computing the orientation (i.e., monitoring changes in rotation on the rate sensor), the actual acceleration can be determined. According to an alternative method, two tri-axial accelerometers having a fixed separation in space, and attached to the headset 110, are used to clarify orientation of the headset 110. Rotations about the center can be detected by differential readings in the two accelerometers, and linear translation is indicated by a common mode signal. While any of various rate sensors and accelerometers may be employed, an NEC/Tokin CG-L53 or Murata ENC-03 integrated piezoelectric ceramic gyros may be used to implement the rate sensor, and a Kionix KXPA4-2050 integrated micro-machined silicon accelerometer may be used to implement the tri-axis accelerometer.

By performing multiple integrations of measured acceleration of the headset 110 when the user 112 is wearing or carrying the headset 110, the position or proximity of the headset 110 and user 112 can be established and communicated back to the BS 104 over the first wireless link 114. To accurately track the proximity of the headset 110 and user 112 to the BS 104, a frame of reference defining an initial location of the headset 110 can be established by transmitting a signal from the RF transceiver of the headset 110 to the BS 104 during times when the user 112 is determined to be interacting with the first computer 100, for example. After calibrating the initial location and the headset 110 is put into motion, the accelerometer commences integration. Information from the integration process is transmitted by the RF transceiver of the headset 110 to the BS 104 for use by the real-time communication and presence application 102 to determine base proximity.

Figure 4:
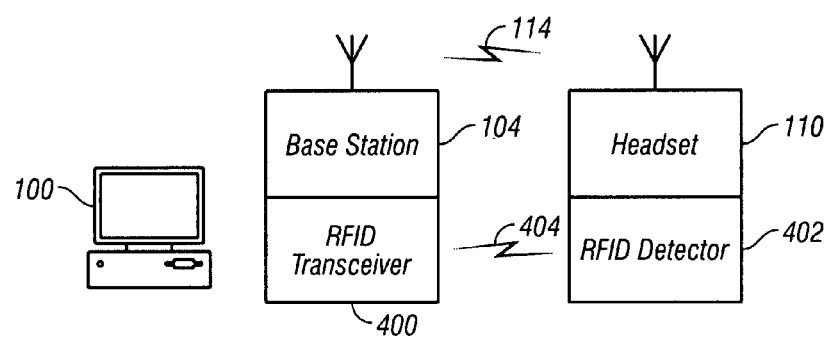
FIG. 4 is a drawing illustrating how an RFID transceiver and RFID detector may be employed to determine proximity of an intelligent headset to a wireless base station, in accordance with an aspect of the present invention.

In an alternative embodiment, shown in FIG. 4, a radio frequency identification (RFID) transceiver 400 is provided, and the headset 110 is configured to include an RFID detector 402. The RFID transceiver 400 is operable to broadcast an RFID band signal (e.g., 13.56 MHz) containing a constant repetition of a coded ID over an RFID link 404. The RFID detector 402 is associated with the RFID transceiver 400 by storing the ID when at close range. Once properly associated and authenticated to the RF transceiver 400, the RFID detector 402 measures the field strength received from the RF transceiver 400. The measured field strength is then reported back to the RFID transceiver 400 and real-time communication and presence application 102, via the wireless link 114, to provide data that can be used to estimate the proximity of the headset 110 to the RFID transceiver 400.

Figure 5:
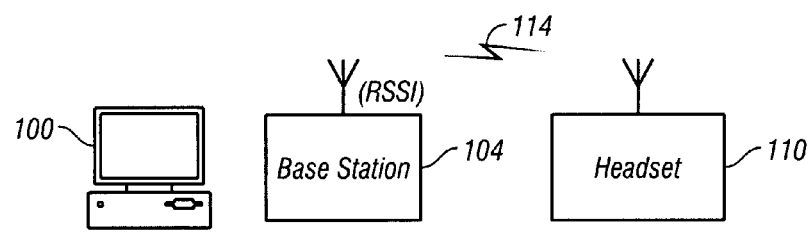
FIG. 5 is a drawing illustrating how RSSI may be employed to determine proximity of an intelligent headset to a wireless base station, in accordance with an aspect of the present invention.

In yet another embodiment, shown in FIG. 5, the received signal strength indicator (RSSI) of the wireless link 114 is measured and monitored to determine the proximity of the headset 110 from the BS 104. An advantage of this approach is that no additional circuitry, other than the RF circuitry in the headset is required. The RSSI can be measured and monitored either at the headset 110 or at the headset BS 104. If measured and monitored at the BS 104, the headset 110 can be configured to query the BS 104 as to what the RSSI is. Then, the RSSI, together with known transmit power, allows base proximity to be determined.

The intelligent headset 110 may be further configured to include a proximity and usage application and an associated microprocessor-based (or microcontroller-based) subsystem. The headset proximity and usage application and microprocessor-based subsystem provide proximity and usage characteristics of the headset 110 and/or user 112 to the headset's RF transceiver, which reports the proximity and usage characteristics to the real-time communication and presence application 102. The proximity and usage characteristics may be reported on a scheduled basis (e.g., periodically), in response to changes in the characteristics of the wireless link 114, in response to detected movement or wearage state of the headset 110, by the user pushing a button on the headset, or by any other suitable means.

The real-time communication and presence application 102 described in FIGS. 1 and 2 above comprises a stand alone computer program configured to execute on a dedicated computer 100. In an alternative embodiment, the real-time communication and presence application is adapted to operate as a client program, which communicates with real-time communication and presence servers configured in a client-server network environment.

Figure 6:
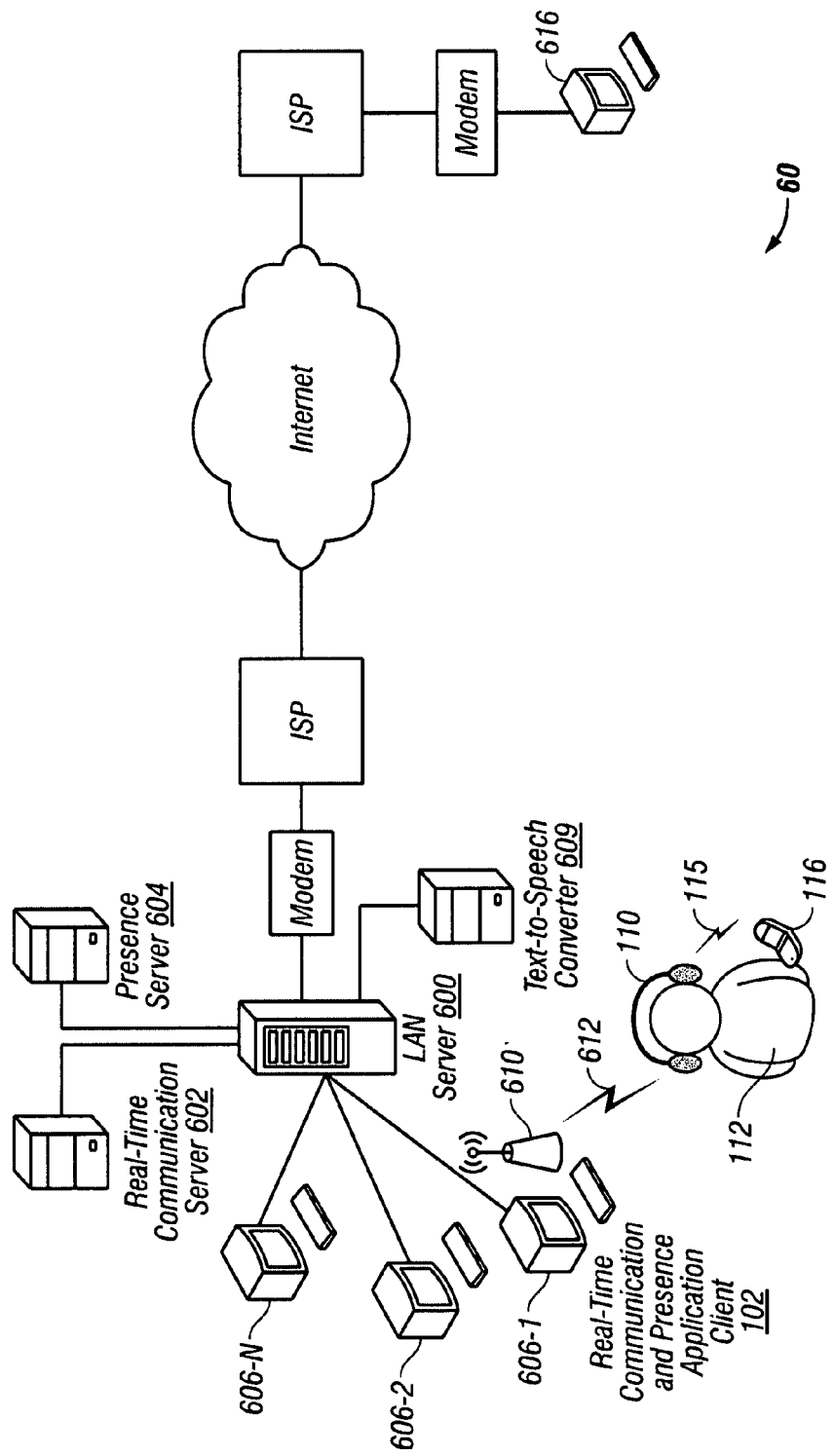
FIG. 6 is a drawing illustrating a client-server-based headset-derived presence and communication system, according to an embodiment of the present invention.

FIG. 6 shows an exemplary client-server-based headset-derived presence and communication system 60, according to an embodiment of the present invention. The system 60 comprises a LAN server 600, a real-time communication server 602, a presence server 604, a plurality of client computers 606-1, 606-2, . . . , 606-N (where N is an integer greater than or equal to one), a real-time communication and presence application client 608 installed on one or more of the client computers 606-1, 606-2, . . . , 606-N, an optional text-to-speech converter 609, an intelligent headset 110, and a wireless BS 610. The BS 610 is configured to receive proximity and usage characteristics of the headset 110 and/or user 112 over a wireless (as shown) or wireless link 612. The real-time communication and presence application client 608 communicates the received proximity and usage information to the LAN server 600. The LAN server 600 relays the received information to the presence server 604, which is configured to store an updatable record of the proximity and usage state of the headset 110. The real-time communication and presence servers 602, 604 use the proximity and usage state record to generate and report presence information of the user 112, or a "shift" in presence status of the user 112, to other system users, for example to a user stationed at the remote computer 616. As explained in more detail below, a "shift" in presence status provides an indication that the user 112 has shifted from one mode of communication to another (e.g., from IM to a mobile device 116 such as a cell phone, personal digital assistant (PDA), handheld computer, etc.).

The real-time communication and presence servers 602, 604 are also operable to signal the real-time communication and presence application client 608 on the client computer 606-1 that a real-time communication (e.g., an IM or VoIP call) has been received from the remote computer 616. The real-time communication and presence application client 608 can respond to this signal in a number of ways, depending on which one of various proximity and usage states the intelligent headset 110 is in.

Figure 7A:
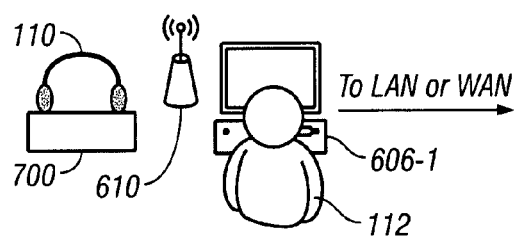
FIG. 7A is a drawing illustrating a first proximity and usage state in which the intelligent headset of the present invention is plugged into a charging cradle, in accordance with an aspect of the present invention.

FIG. 7A shows a first proximity and usage state in which the intelligent headset 110 is plugged into a charging cradle 700 coupled to the client computer 606-1. When in this proximity and usage state, the presence server 604 is configured to store a proximity and usage record indicating that the headset 110 is plugged into the charging cradle 700. The proximity and usage record is referenced by the LAN server 600 to report to other system users that it is unknown whether the user 112 is available to accept real-time communications at the client computer 606-1. Nevertheless, if a real-time communication is received while the headset 110 is in this state, the real-time communication may be displayed as text on the display screen of the client computer 606-1 or audibilized as sound through the sound system of the client computer 606-1. Additionally (or alternatively), the real-time communication and presence application client 608 may send an alert signal, via the wired or wireless link 612, to an acoustic transducer (e.g., a speaker), vibrating mechanism, or other user-sensible signaling mechanism configured within or on the intelligent headset 110 (e.g., a flashing light-emitting diode (LED)), in an attempt to signal the user 112 that the real-time communication has been received. If the user 112 happens to be stationed at or near the client computer 606-1, the user 112 may then either ignore the real-time communication or reply to it.

Figure 7B:
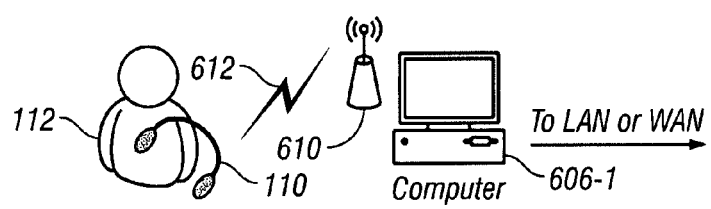
FIG. 7B is a drawing illustrating a second proximity and usage state in which the intelligent headset of the present invention is within range of a BS or AP, and is being carried by a user (e.g., in a shirt pocket or around the user's neck), but is not being worn on the head of the user (i.e., is not donned by the user), in accordance with an aspect of the present invention.

FIG. 7B shows a second proximity and usage state in which the headset 110 is within range of the BS 610, and is being carried by the user 112 (e.g., in a shirt pocket or around the user's neck), but is not being worn on the head of the user 112 (i.e., headset is "undonned"). There are various types of sensors and detectors which can be employed to determine whether the headset 110 is donned or undonned and whether the headset is being carried. For example, an accelerometer, such as that described in FIG. 3 above, may be used to determine whether the headset 100 is being carried. Other motion detection techniques may also be used for this purpose. Some techniques that can be used to determine whether the headset is donned or undonned include, but are not limited to, utilizing one or more of the following sensors and detectors integrated in the headset 110 and/or disposed on or within one or more of the headphones of the headset 110: thermal or infrared sensor, skin resistivity sensor, capacitive touch sensor, inductive proximity sensor, magnetic sensor, piezoelectric-based sensor, and motion detector. Further details regarding these sensors and detectors can be found in the commonly assigned and co-pending U.S. patent application entitled "Donned and Doffed Headset State Detection", which was filed on Oct. 2, 2006, and which is hereby incorporated into this disclosure by reference.

Figure 7C:
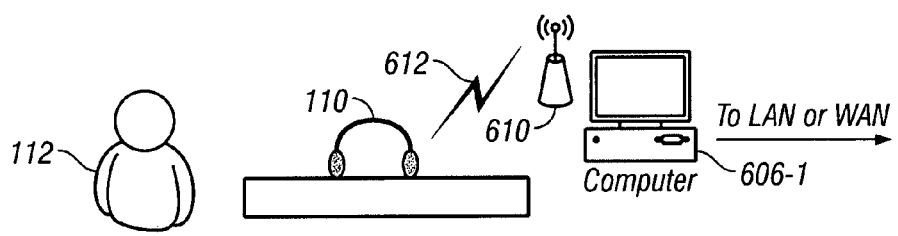
FIG. 7C is a drawing illustrating a third proximity and usage state in which the intelligent headset of the present invention is neither donned nor being carried, but is within range of a BS or AP, in accordance with an aspect of the present invention.

FIG. 7C shows a third proximity and usage state in which the headset is neither donned nor being carried, but is within range of the BS 610. This proximity and usage state may occur, for example, if the headset is lying on a desk or table 702 (as shown in FIG. 7C), yet is powered on and within range of the BS 610.

When a real-time communication is received while the proximity and usage record of the presence server 604 indicates that the headset 110 is in one of the proximity and usage states shown in FIGS. 7A-C, the real-time communication and presence servers 602, 604 signal the real-time communication and presence application client 608 on the client computer 606-1 to transmit an alert to the RF transceiver of the headset 110, via the BS 610. An acoustic transducer (e.g., a speaker), vibrating mechanism, or other user-sensible signaling mechanism (e.g., a flashing LED) configured within or on the headset 110 is then triggered, in an attempt to signal the user 112 of the incoming real-time communication, thereby prompting the user 112 to don the headset 110. If available, the user 112 may respond to the alert by first donning the headset 110 and then pushing a button on the headset 110 or verbalizing a command, to receive an identification of the real-time communication initiator or a voice-converted message derived from the real-time communication message.

Figure 7D:
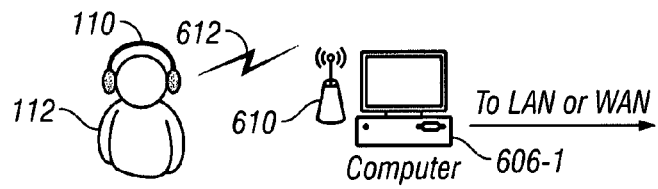
FIG. 7D is a drawing illustrating a fourth proximity and usage state in which the intelligent headset of the present invention is within rang of a BS or AP and is donned by a user, in accordance with an aspect of the present invention.

FIG. 7D shows a fourth proximity and usage state in which the intelligent headset 110 is within range of the BS 610 and is donned by the user 112. The intelligent headset 110 determines that the headset 110 is donned, for example, as described in the commonly assigned and co-pending patent application entitled "Donned and Doffed Headset State Detection" incorporated by reference above, and reports the usage state to the real-time communication and presence application client 608. Upon receipt of a real-time communication, the real-time communication and presence servers 602, 604 signal the real-time communication and presence application client 608 to send an alert signal over the link 612, which is used by a transducer in the headset 110 to cause the headset 110 to vibrate, generate an audible tone, or provide some other form of user-sensible signal. The user 112 may respond to the alert by pushing a button on the headset 110 or verbalizing a command to receive an identification of the real-time communication initiator or a voice-converted message derived from the real-time communication message. The headset 110 may be alternatively (or also) equipped with a small display screen to display the identity of the real-time communication initiator and/or the real-time communication itself. The user 112 can then use the alert signal, audible and/or visual information to determine whether to respond to the real-time communication.

Figure 7E:
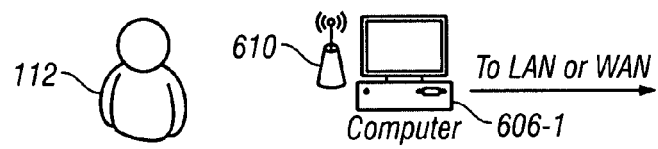
FIG. 7E is a drawing illustrating a fifth proximity and usage state in which the intelligent headset of the present invention is turned off or a communication link between the headset and a BS or AP does not exist or is not established.

FIG. 7E shows a fifth proximity and usage state in which the headset 110 is either turned off or a communication link between the headset 110 and the base station 610 does not exist. When in this proximity and usage state, other system users are alerted that the user 112 is not using the headset 110 but may be available to communicate using traditional IM. Accordingly, incoming IMs are routed by the real-time communication server 602 the client computer 606-1 similar to as is done in conventional IM systems.

Figure 7F:
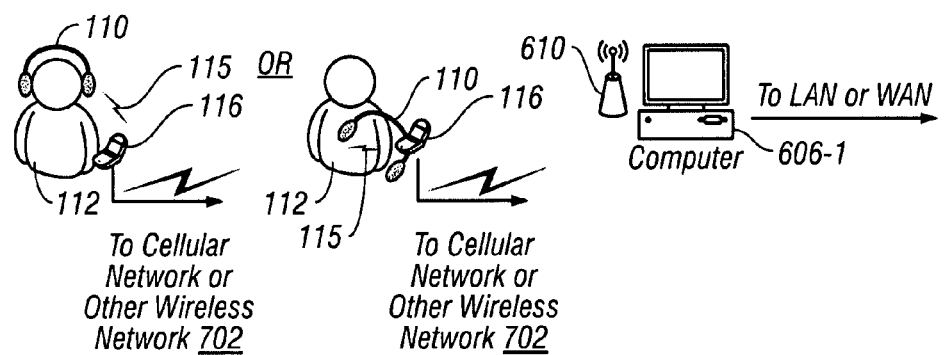
FIG. 7F is a drawing illustrating a sixth proximity and usage state in which a user has shifted from communicating using the intelligent headset to an alternate mode of communicating (e.g., by use of a cell phone or other mobile communications device)

FIG. 7F shows a sixth proximity and usage state in which the intelligent headset 110 is powered on and is being carried or donned by the user 112, but the user has shifted from communicating using the intelligent headset to an alternate mode of communicating (e.g., by use of a cell phone or other mobile communications device). For the purpose of this disclosure, the wireless link 612 between the transceiver of the headset 110 and the BS 610 is considered to be "out of range" when the link 612 is completely broken or when a signal strength of a specified signal falls below some predetermined threshold. The headset 110 may be out of range for any number of reasons. For example, in a business environment, as the user 112 leaves their office (e.g., to go to a meeting, the bathroom, lunch, etc.), signals communicated over the wireless link 612 will eventually diminish in strength due to the transceiver of the headset 110 becoming farther away from the BS 610. Once the real-time communication and presence application client 608 determines that the headset 110 is out of range of the BS 610, the real-time communication and presence application client 608 reports this change in proximity and usage state to the presence server 604, which updates its proximity and usage records accordingly. The LAN server 600 may then use this updated proximity and usage record to notify other system users (e.g., a user stationed at the remote computer 616) that the user 112 is unavailable to reply to real-time communications delivered to the client computer 606-1 and/or that the user 112 may have shifted presence to the mobile device 116.

As alluded to above, at times the user 112 may shift presence from using the headset 110 to communicate to using some other mode of communication (e.g., a mobile device 116 such as a cell phone). When such an event occurs, the presence server 604 is updated to indicate this shift in presence status. According to one embodiment of the invention, the mobile device 116 is configured to transmit a "shifted presence signal" to an operating center of a cellular network or other wireless network 702 having Internet access. The operating center converts the shifted presence signal into Internet compatible data packets, which are sent over the Internet to the LAN server 600. The LAN server 600 then forwards the shifted presence information contained in the received data packets to the presence server 604, which updates its proximity and usage record of the user 112 accordingly. Other system users will then be notified of the user's 112 shifted presence status, thereby allowing them an opportunity to contact the user 112 via the alternate mode of communicating, and without having to wastefully send a message that the user 112 is unavailable or unable to respond to.

According to one aspect of the invention, control or communications signals received by the Internet accessible cellular network 702 are used to generate Internet compatible data packets characterizing the shifted presence signal. The Internet compatible data packets are communicated to the presence server 604 to indicate the shifted presence state of the user 112. According to one embodiment, the user 112 is required to proactively notify a shift in presence by, for example, sending a text message (or other signal) from the mobile device 116 to the Internet accessible cellular network 702. A converter in the cellular network infrastructure (e.g., at a network operating center of the cellular network) converts the text message to IP compatible data packets and transmits the IP compatible data packets to the IP address associated with the LAN server 600. The LAN server 600 then communicates the IP compatible data packets to the presence server 604, which updates its proximity and usage record of the user 112 to indicate the user's shifted presence state.

According to another embodiment, the headset 110 is configured to trigger the sending of the shifted presence signal based on, for example, the strength of signals communicated over the wireless link 612, or on a signal received by the headset 110 over the second wireless link 115 indicating that the mobile device 116 is being used. When the signal strength of a specified signal communicated between the headset 110 and the BS 610 breaks or falls below some predetermined threshold, or the headset 110 receives a signal indicating that the mobile device 116 is being used, the headset 110 sends a trigger signal to the mobile device 116, e.g., via the local second wireless link 115. The mobile device 116 responds to the trigger signal by generating and transmitting a shifted presence signal, which is received by an operating center of an Internet accessible cellular network 702. IP compatible data packets characterizing the shifted presence signal are communicated over the Internet from the operating center to the LAN server 600 of the system 60, in a manner similar to that described above. The presence server 604 updates it proximity and usage record according to the shifted presence information contained in the data packets to reflect the shifted presence status of the user 112.

Data characterizing the various proximity and usage states described above, including whether the user has shifted presence from using the headset 110 to another mode of communication, may be communicated back to the presence server 604 at any time (e.g., prior to, during or following receipt of a real-time communication), to ensure that the presence server 604 has the most up-to-date proximity and usage record of the user 112 and/or headset 110. Updating the proximity and usage record of the user 112 and/or headset 110 may be initiated manually by the user 112 (e.g., by pushing a button on the headset 110), in response to some physical or operational characteristic of the headset 110 (e.g., movement or donning the headset 110), or automatically according to a predetermined reporting and update schedule. The most up-to-date proximity and usage record is then used by the real-time communication and presence servers 602, 604 to generate presence status signals, which are used by real-time communication application clients on other user's computers to display the most up-to-date presence status of the user 112.

Figure 8:
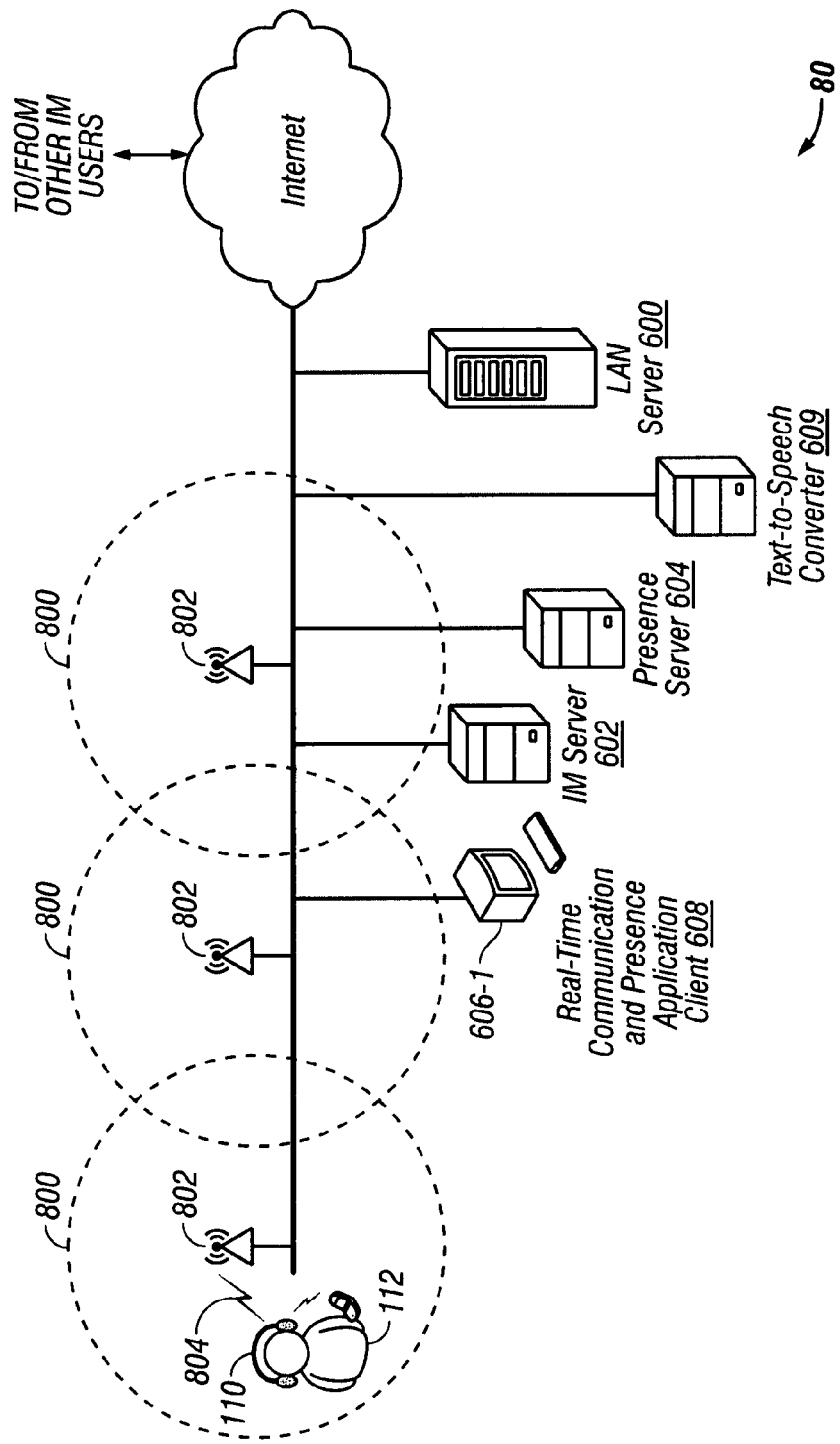
FIG. 8 is a drawing illustrating a headset-derived presence and communication system having a plurality of overlapping multi-cell IEEE 802.11 or 802.16 networks 800, in accordance with an embodiment of the present invention.

While the exemplary embodiments above have been described in the context of point-to-point wireless communications, the systems and methods of the present invention can also be adapted to operate in other environments not requiring a point-to-point wireless connection. FIG. 8 shows, for example, a headset-derived presence and communication system 80 having a plurality of overlapping multi-cell IEEE 802.11 networks 800, in accordance with an embodiment of the present invention. Operation is similar to that described above in FIG. 6, except that the headset 110 is not required to communicate point-to-point to a dedicated BS 610. Rather, a plurality of access points (APs) 802 are made available to receive proximity and usage information of the headset 110 and to send and receive real-time communications to and from the headset 110 over wireless links. The RF transceiver in the headset 110 is adapted to establish the best possible connection with one of the plurality of APs 802. The overlapping cells 800 allow the user 112 to roam between the overlapping cells 800 and constantly maintain the wireless connection 804. Real-time communication sessions can also be maintained and proximity and usage information of the headset 110 reported while moving from cell to cell. The coverage area is limited only by the number of cells. One advantage of this approach is that the plurality of APs 802 can extend the coverage to much larger areas, e.g., an entire building or work campus, than can the point-to-point approach. While the headset-derived presence and communication system 80 is shown in the context of a plurality of overlapping IEEE 802.11 cells 800, those of ordinary skill in the art will readily appreciate and understand that other types of overlapping multi-cell technologies could alternatively be used (e.g. 802.16 MAN, cellular, and DECT networks).

Figure 9A:
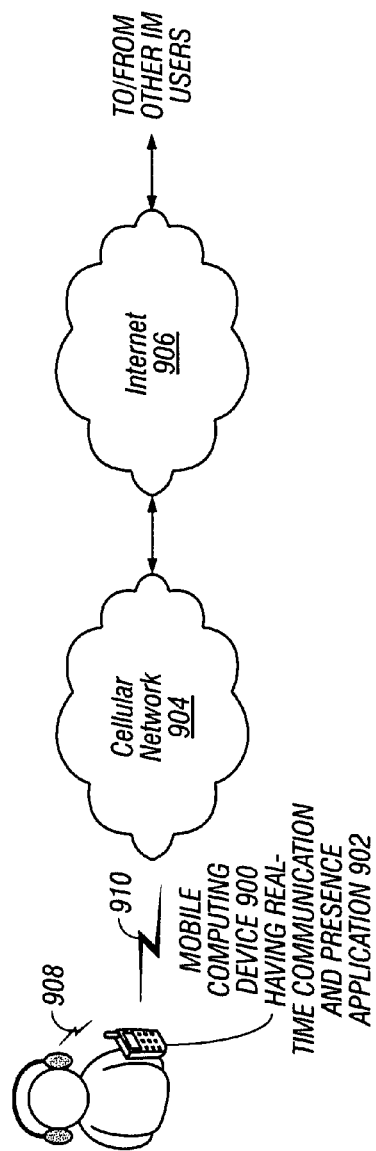
FIG. 9A is a drawing illustrating how a mobile computing device having a real-time communication and presence application may be configured to communicate proximity and usage state information of the intelligent headset of the present invention over a cellular network and the Internet to other real-time communication users, in accordance with an embodiment of the present invention.
Figure 9B:
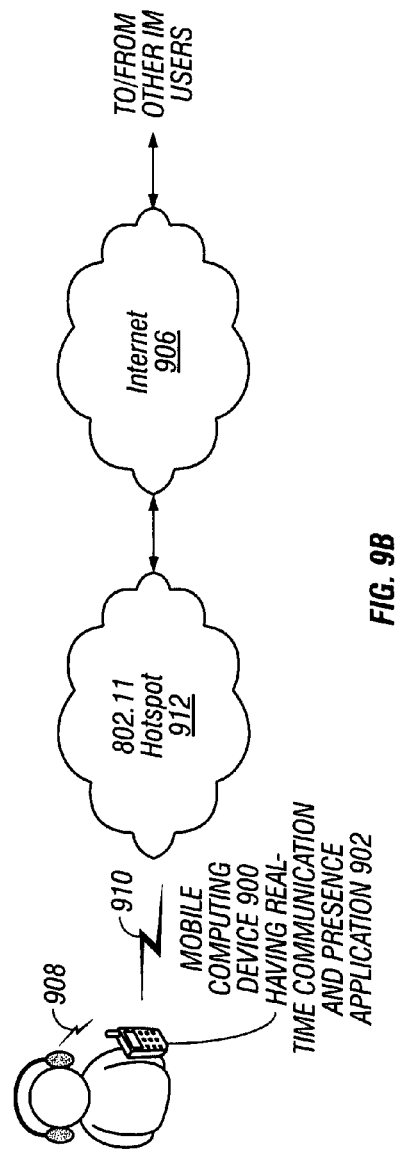
FIG. 9B is a drawing illustrating how a mobile computing device having a real-time communication and presence application may be configured to communicate proximity and usage state information of the headset over an IEEE 802.11 hotspot and the Internet to other real-time communication users, in accordance with an embodiment of the present invention.

The exemplary embodiments described above include a fixed computing device (e.g., computer 100 in FIGS. 1 and 2) configured to execute a real-time communication and presence application 102 and a fixed computing device (e.g., client computer in FIGS. 6 and 8) configured to execute a real-time communication and presence application client 608. According to another embodiment of the invention, a mobile computing device (e.g., a smart phone, personal digital assistant (PDA), laptop computer, etc.) is configured to include a real-time communication and presence application or client. For example, FIG. 9A illustrates how a mobile computing device 900 having a real-time communication and presence application 902 may be configured to communicate proximity and usage state information of the headset 110 and/or user 112 over a cellular network 904 and the Internet 906 to other system users. A communication link (e.g., a Bluetooth link) 908 between the headset 110 and the mobile computing device 900 is used to transfer proximity and usage state information of the headset 110 and/or user 112 to the real-time communication and presence application 902, which formats the information in a manner suitable for communicating the information to a cellular network 904, over a second wireless link 910, and ultimately to the other system users via the Internet 906. While the real-time communication and presence application 902 on the mobile computing device 900 has been described as being adapted to communicate proximity and usage information of the headset 110 and/or user 112 to a cellular network 904, those of ordinary skill in the art will readily appreciate and understand that the real-time communication and presence application 902 may alternatively be adapted to communicate the proximity and usage information over other types of networks. For example, FIG. 9B shows how the proximity and usage information of the headset 110 and/or user 112 may be communicated to an IEEE 802.11 hotspot 912, which is adapted to forward the information to other system users via the Internet 906.

Figure 10:
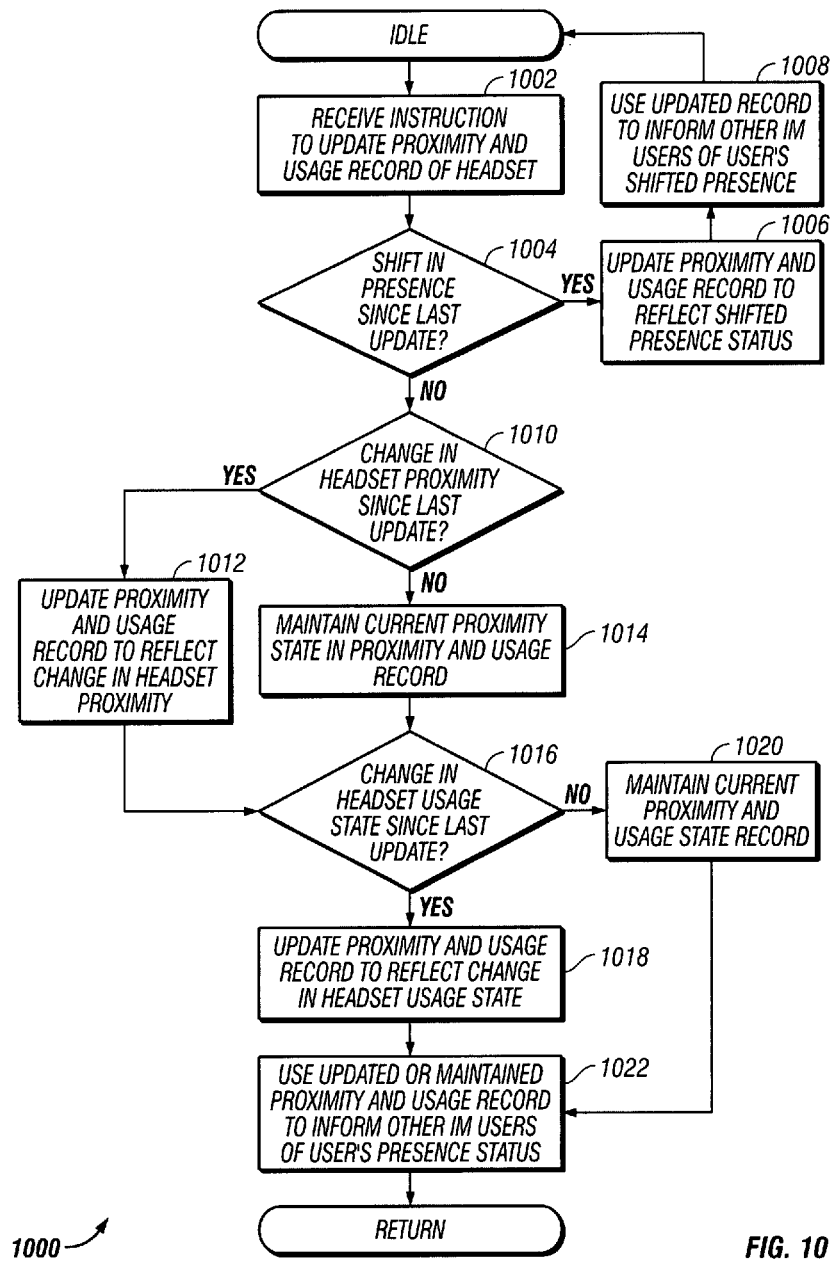
FIG. 10 is a flowchart illustrating an exemplary process by which the system in FIG. 6 operates to update the proximity and usage record of a user, according to an embodiment of the present invention.

Referring now to FIG. 10, there is shown a flowchart illustrating an exemplary process 1000 by which the system 60 in FIG. 6 operates to update the proximity and usage record of the user 112, according to an embodiment of the present invention. While the exemplary process 1000 below is described in the context of instant messaging, those of ordinary skill in the art will readily appreciate and understand that the process 1000 can be adapted and modified, without undue experimentation, for use with other real-time communication types (e.g., VoIP).

Prior to receiving an instruction to update the proximity and usage state of the user 112, the process 1000 holds in an idle state. Once an instruction is received to update the proximity and usage record of the user 112 at step 1002, the update process commences. Triggering of the update instruction can occur automatically according to a predetermined update schedule, manually (e.g., by the user 112), by a detected change in proximity of the headset 110 to the BS 610 (e.g., headset 110 coming within range or going out-of-range of the BS 610), by a detected change in usage state of the headset 110 (e.g., being plugged into or unplugged from charging station, being picked up from or set down on a table or other surface, being donned or undonned), or by any other input or condition characterizing the proximity or usage state of the headset 110.

In response to the update instruction in step 1002, at decision 1004 it is determined whether a change in the presence status of the user 112 involving a shift in presence has occurred compared to the last proximity and usage record stored by the presence server 604. If "yes", at step 1006 the real-time communication and presence application client 608 reports the shifted status of the user 112 to the presence server 604 to reflect the shift in presence of the user 112. Alternatively, as explained above, shifted presence information received over the Internet from a cellular network or other wireless network may be used at step 1006 to update the record. Next, at step 1008 the real-time communication, presence and LAN servers 602, 604, 600 use the updated proximity and usage record to report an updated presence status of the user 112 to other IM users that have the user 112 in their buddy list. The other updated presence status information is used by the real-time communication application clients executing on the other user's computers to generate a presence status indicator, which informs the other users that the user 112 is not currently available to respond to IMs on the client computer 606-1, yet may be contacted by some alternate form of communication (e.g., by cell phone).

If at decision 1004 it is determined that the user 112 has not shifted presence since the last proximity and usage record update, at decision 1010 the real-time communication and presence application client 608 is contacted to determine whether it has received information characterizing a change in proximity of the headset 110 (e.g., going out-of-range or coming within range of the BS 610) compared to the last proximity record stored in the presence server 604. If "yes", at step 1012 the real-time communication and presence application client 608 reports to the presence server 604 that there has been a change in proximity status of the headset 110 since the last recorded update, and the presence server 604 uses the change in proximity information to update the proximity information of the proximity and usage record accordingly. If "no", the proximity information of the most recent proximity and usage record is not changed, as indicated by step 1014.

Next, at decision 1016, the real-time communication and presence application client 608 is contacted to determine whether a change in the usage state of the headset 110 has occurred since the last proximity and usage record update. (It should be mentioned here that the decisions 1004, 1010 and 1016 can be performed in any order and need not be performed in the same order as described here in this exemplary embodiment.) If "yes", meaning that the real-time communication and presence application client 608 has detected that the user 112 has donned or undonned the headset 110, has set down the headset 110 after having been carried, has picked up and started carrying the headset 110, has plugged the headset 110 into or unplugged the headset 110 from the charging cradle 700, at step 1018 the real-time communication and presence application client 608 reports the usage change to the presence server 604, which updates the usage information of the proximity and usage record of the user 112 accordingly. If "no", meaning that no detection in either the proximity or usage state of the headset 110 has been detected since the last record update, the current proximity and usage record is maintained, as indicated by step 1020.

At step 1022 the real-time communication, presence and LAN servers 602, 604, 600 use the maintained proximity and usage record (from step 1020) or the updated proximity and usage record (from step 1018) to report an updated presence status of the user 112 to other IM users that have the user 112 in their buddy list. Finally, the process returns to the idle state to await a subsequent instruction to update the proximity and usage record of the user 112.

Figure 11:
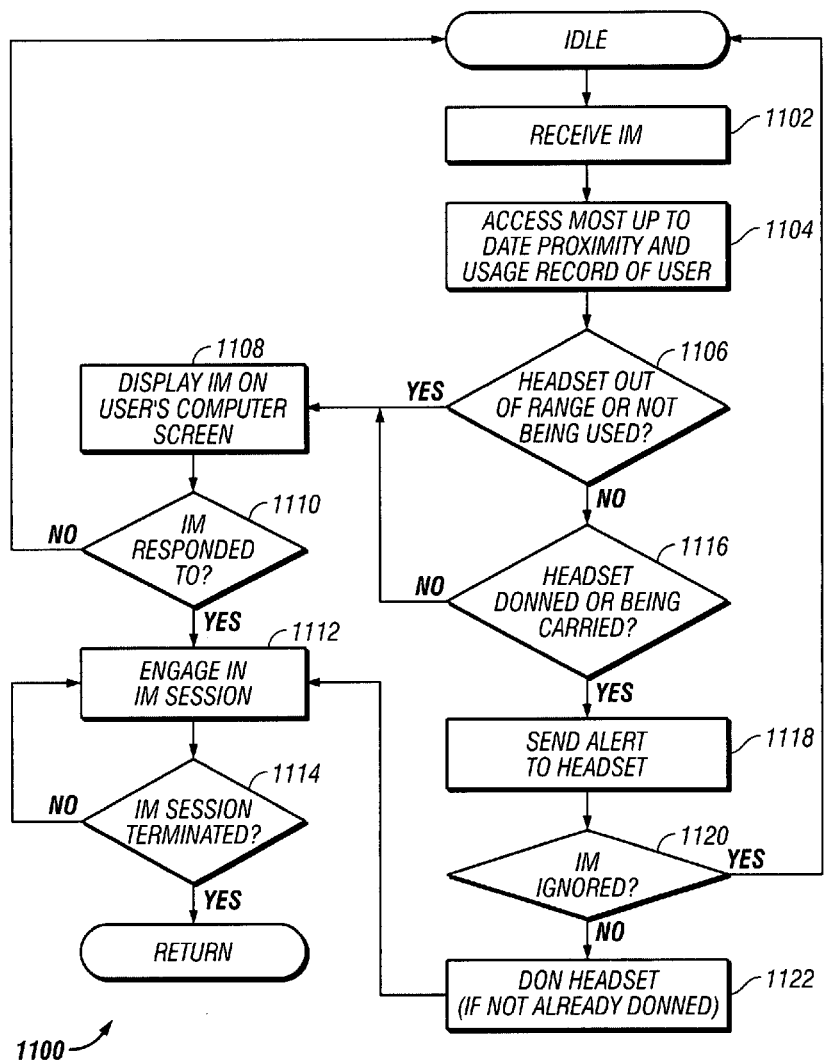
FIG. 11 is a flowchart illustrating an exemplary process by which the system in FIG. 6 routes an incoming IM based on the most up-to-date proximity and usage record of a user, according to an embodiment of the present invention.

FIG. 11 is a flowchart illustrating an exemplary process 1100 by which the system 60 routes an incoming IM based on the most up-to-date proximity and usage record of the user 112 stored on the presence server 604, according to an embodiment of the present invention. While the exemplary process 1100 below is described in the context of instant messaging, those of ordinary skill in the art will readily appreciate and understand that the process can be adapted and modified, without undue experimentation, for use with other real-time communication types (e.g., VoIP).

During an idle state in which the system 60 waits for an incoming IM, the process 1000 in FIG. 10 may be executed to ensure that the presence server has the most up-to-date proximity and usage record of the user 112, and so that other IM users have the most up-to-date presence status information of the user 112. The method 1100 holds in this idle state until the system 60 receives an IM. Once the system 60 receives an IM at step 1102, at step 1104 the presence server 602 is accessed to determine the most up-to-date proximity and usage record of the user 112. Then, at decision 1106 it is determined whether the proximity and usage record indicates that the headset 110 is out-of-range or the user 112 is for some reason not using the headset 110. The headset 110 may not be being used for any number of reasons. For example, the headset 110 may be turned off, plugged into the charging cradle 700, sitting on a desk or other surface, or may be stored in a location that is not readily accessible by the user 112.

If at decision 1106 it is determined that the headset 110 is either not being used or is out-of-range of the BS 610, it is not determinable whether the user 112 is available to respond to IMs at the client computer 606-1. Although the availability of the user 112 is indeterminate in this state, other users may nevertheless send IMs to the user 112 at the client computer 606-1, in case the user 112 happens to be stationed there. Accordingly, at step 1108 the real-time communication and presence application client 608 operates to display the IM on the display screen of the client computer 606-1. If the user 112 happens to be stationed at the client computer 606-1, the user 112 may then respond to the IM in a conventional manner. Accordingly, at decision 1110 a determination is made as to whether the user 112 has responded to the IM. If "no", the process returns to the idle state to wait for subsequent IMs. If "yes", meaning that the user 112 is available and willing to communicate, at step 1112 the IM initiator and user 112 engage in an IM session. The IM session then continues until at decision 1114 the IM session is determined to have been terminated by one of the IM participants. After the IM session is terminated, the process returns to the idle state to wait for subsequent IMs.

If at decision 1106 it is determined that most up-to-date proximity and usage record indicates that the headset 110 is not out-of-range of the BS 610 and is being used by the user 112 (or is at least readily accessible by the user 112), at decision 1116 the most up-to-date proximity and usage record is analyzed to determine whether the headset is donned or being carried by the user 112. If the record indicates that the headset 110 is donned or being carried by the user 112, at step 1118 the real-time communication and presence application client 608 sends an alert signal to the proximity and usage application in the headset 110, via the wireless link 612. The alert signal causes the headset 110 to vibrate, generate an audible tone, generate some other user-sensible signal, and/or provide some indication of the identity of the IM initiator to the user 112. According to one embodiment the identity of the IM initiator and/or the IM are converted to speech by the text-to-speech converter 609. The speech converted information is then transmitted over the wireless link 612 to the headset 110, in lieu of (or in combination with) the alert signal. This allows the user 112 to hear the identity of the IM initiator and/or listen to the speech converted IM. According to another embodiment, the headset 110 is equipped with a small display screen configured to display the identity of the IM initiator and/or the IM. The display information can be combined with either or both the audible information and alert signal. The user 112 can then use the alert signal, audible and/or visual information to determine whether to respond to the IM.

Next, at decision 1120 it is determined whether the user 112 has decided to ignore the incoming IM. If "yes", the process returns to the idle state to await subsequent IMs. On the other hand, if the user 112 has decided to respond to the IM, the user 112 may either respond by typing text through the keyboard attached to the client computer 606-1 (i.e., in a conventional manner) or may don the headset 110 (if it hasn't already been donned) at step 1122. In accordance with the latter approach, IMs received from the IM initiator are first converted to speech by the text-to-speech converter 609 before they are sent to the headset 110. The user 112 responds to the IMs by talking into a microphone in the headset 110. These voice signals are transmitted by an RF transmitter in the headset 110 to the BS 610 and down-converted for processing by the real-time communication and presence application client 608. Voice recognition software on the client computer 606-1 or on one of the servers of the system 60 then converts the voice encoded signals to a text-formatted IM, which is forwarded by the real-time communication server 602 back to the IM initiator. The IM participants continue to engage in the IM session in this manner, as indicated by step 1112 until at decision 1114 it is determined that the IM session has been terminated. After the session is terminated the process 1100 returns to the idle state to wait for receipt of subsequent IMs.

If at decision 1116 it is determined that the headset is neither donned or being carried by the user 112, the IM is displayed on the computer screen of the client computer 606-1 and/or an alert signal, similar to that described in step 1118 above, is sent to the headset 110, in an attempt to notify the user 112 of the incoming IM. The user 112 may then respond to the IM and engage in an IM session in a conventional manner (as shown in FIG. 11), or the user 112 may don the headset and engage in an IM session using voice in a manner similar to that described in the previous paragraph.

While the processes in FIGS. 10 and 11 have been described in the context of the client-server-based headset-derived presence and communication system in FIG. 6, those of ordinary skill in the art will readily appreciate and understand that the methods can be easily adapted, without undue experimentation, to operate in the context of the "stand-alone" embodiments shown in FIGS. 1 and 2, as well as in the multi-cell and mobile computing device embodiments shown in FIGS. 8 and 9.

Further, whereas the presence server 604 in the exemplary embodiments has been described as providing the presence status of a user to other system users who wish to initiate a one-on-one real-time communication session, the presence server 604 may also be configured to perform other tasks. For example, the presence server 604 may be configured to perform presence initiated conferencing. According to this aspect of the invention, the presence server 604 continually monitors the presence states of the system's various users. When the presence server 604 determines that specified users scheduled to participate in a conference call are all available, the presence server 604 instructs the system to send a user-sensible alert to the scheduled participants' headsets, telephones (desk phone or mobile phone), or PCs. This aspect of the invention is particularly useful in business environments where often times urgent matters must be resolved as soon as specified persons are available to participate. Another benefit of this aspect of the invention is that it does not require users to manually adjust their presence status, which can be difficult to do in a work environment where a user's presence status often changes multiple times throughout the day. Instead, the intelligent headset of the present invention may be relied on to automatically feed changes in the presence status of users to the presence server 604 in real time. As soon as all required participants are detected as being available, the presence server 604 instructs the system to initiate the conference call. In situations where a required user is determined to be not yet available for the conference call (for example, perhaps they are in another meeting), the system can send a user-sensible signal (e.g., a tone, visual display of an urgent message, etc.) to the headset's of the currently unavailable user, to indicate that an urgent matter has arisen, which requires the user's immediate attention. In response to the user-sensible signal, the needed participant may then change their presence status (e.g. by way of a control signal sent from a switch or button on the user's headset, voice activation, etc.), thereby indicating to the presence server 604 that the user is now available to participate in the conference call.

According to another embodiment of the invention, the intelligent headset 110 of the present invention may be configured to provide a "secure presence" function. According to this embodiment of the invention, a user's headset is used as a "key" or an authentication means for automatically unlocking the user's PC when the user arrives at their PC after being away for some time. Authentication may be performed at the application data or device level and avoids the need for having to enter Ctl+Alt+Del and password. This aspect of the invention is advantageous in that it prevents pretexting (e.g., a user masquerading as a legitimate user), and prevents unauthorized access to applications and data on the PC. To prevent accidental and/or unauthorized use of the headset to gain access to applications and data, the headset can be equipped with a biometric authentication device (e.g., a fingerprint reading device or voice authentication subsystem). The biometric authenticator ensures that the person using the headset is actually the person that the headset belongs to.

In general, the methods described above, including the processes performed by the real-time communication and presence application 102, real-time communication and presence application client 608, real-time communication server 602, presence server 604, LAN server 600, text-to-speech converter, voice recognition, and proximity and usage application in the headset 110 are performed by software routines executing in a computer system. The routines may be implemented by any number of computer programming languages such as, for example, C, C++, Pascal, FORTRAN, assembly language, etc. Further, various programming approaches such as procedural, object-orientated or artificial intelligence techniques may be employed. As is understood by those of ordinary skill in the art, the program code corresponding to the methods and processes described herein may be stored on a computer-readable medium. Depending on each particular implementation, computer-readable media suitable for this purpose may include, without limitation, floppy diskettes, compact disks (CDs), hard drives, network drives, random access memory (RAM), read only memory (ROM) and flash memory.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the intelligent headset has been shown and described as comprising a binaural headset having a headset top that fits over a user's head, other headset types including, without limitation, monaural, earbud-type, canal-phone type, etc. may also be used. Depending on the application, the various types of headsets may include or not include a microphone for providing two-communications. Additionally, whereas the real-time communication server, presence server and text-to-speech converter software are shown in FIG. 6 as being installed on separate server computers, in alternative embodiments one or more of these programs may be configured to execute on a single server computer or integrated in part or in full with the presence application client 608. One or more of the client, server and stand-alone programs may also be web-based, in which case a web server may be included in the client-server network shown in FIG. 6, or on one or more other web servers accessible over the Internet may be employed.

Still further, whereas some of the exemplary embodiments have been described in the context of instant messaging, those of ordinary skill in the art will readily appreciate and understand that the methods, system and apparatus of the invention may be adapted or modified, without undue experimentation, to work with other types of "instant" or "real-time" communications. For example, the systems, methods and apparatus of the present invention may be employed to send, receive and respond to VoIP communications, in a manner similar to that described above in the context of instant messaging. Finally, while the exemplary embodiments have been described in terms of deriving proximity and presence information from a headset, other communications devices may alternatively be used for these purposes. For example, a PDA, smartphone, cellphone, or any other stationary or mobile communication device capable of communicating in real time may be adapted to perform the various functions described in the exemplary embodiments described above. For at least these reasons, therefore, the scope of the invention should not be restricted to the specific exemplary embodiments disclosed herein, and all modifications that are readily suggested to those of ordinary skill in the art should be included within the spirit and purview of this application and scope of the appended claims.

Figure 12:
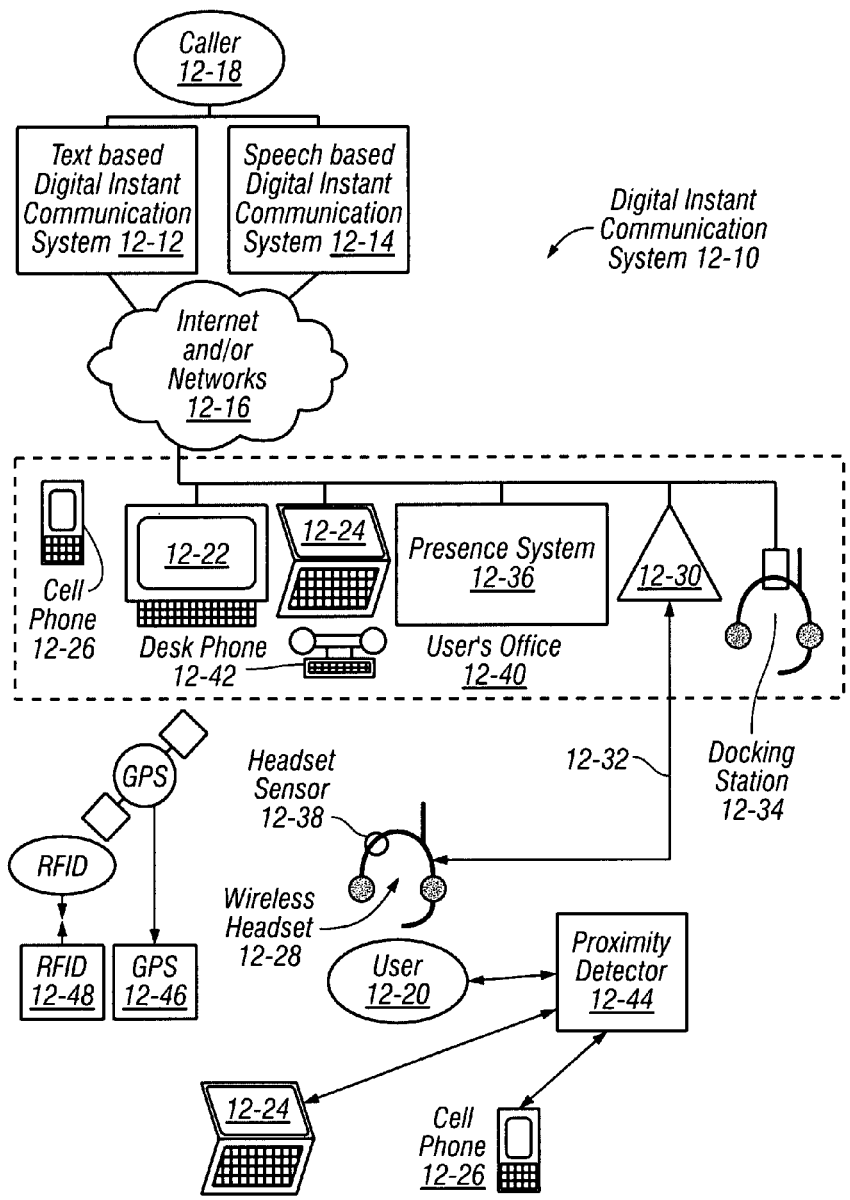
FIG. 12 is a block diagram of one embodiment of digital instant communication system 12-10.

Referring now to FIG. 12, digital messaging system 12-10 may process text based digital instant communications, to or from caller 12-16, such as instant messages (IMs), which may be sent via system 12-12 and speech based digital instant communications, such as VoIP calls and messages, which may be sent via system 12-14. Communications on systems 12-12 and 12-14 may be sent via the Internet or other networks 12-16 to user 12-20 via various computer and communications systems such as desk top computer 12-22, laptop computer 12-24, and/or wireless headset 12-28. VoIP calls may be directed to desk phone 12-42. Headset 12-28 may be wirelessly connected to networks 12-16, and/or via an intermediary device associated with user 12-20 such as computers 12-22 or 12-24 via wireless headset base station 12-30 which communicates with headset 12-28 via wireless connection 12-32. Wireless headset 12-38 may also be connected to networks 12-16 via cell phone 12-26. Headset docking and/or charging station 12-34 may be used for storing headset 12-28 and/or charging the batteries in wireless headset 12-28.

User 12-20's computers 12-22 and/or 12-24 have systems, such as software programs, which respond to and interact with systems 12-12 and 12-14. Presence system 12-36 interacts with digital instant messages from caller 12-18 and monitors one or more conditions related to wireless headset 12-28, for example by monitoring headset sensor 12-38 or other devices such as RFID 12-48, GPS 12-46, proximity detector 12-44 and/or base station or docking station 12-34 or other devices as convenient. Information or data from headset sensor 12-38 may be provided via wireless link 12-32 to presence system 12-36 via a computer such as 12-22 in which presence system 12-36 may be implemented as an application. System 12-36 may also run on a server, not shown.

As described below in greater detail, presence system 12-36 may estimate, from the monitored condition, a potential for user 12-20 to receive and immediately respond to a digital instant communication from caller 12-18 which may be directed to anyone of several devices accessible to user 12-20 for example in his normal workspace such as user's office 12-40 cell, including computer's 12-22, 12-24, cell phone 12-26 and desk phone 12-42. Some of these devices such as notebook computer 12-22 and/or cell phone 12-26 may also be accessible to user 12-20 outside of user's office 12-40 as shown in FIG. 12.

The monitored condition may indicate a current condition or a recent action of user 12-20 which may have been to don the headset by putting it on, doff the headset by taking it off, dock the headset by applying it to docking or charging station 12-34, move while wearing the headset, e.g. out of office 12-40 and/or carry the headset. The difference between a current condition or a recent action may be useful in determining the estimated potential described below. The monitored condition may indicate a likely current relationship, such as proximity, between user 12-20 and headset 12-38, which may be detected by headset sensor 12-38 which may detect a characteristic of user 12-20 such as body temperature.

The monitored condition may also be related to proximity between the headset and a communicating device associated with user 12-20 at that time for receiving and transmitting digital instant communications, such as notebook computer 12-24 and/or cell phone 12-26 which may be with or near user 12-20 for example, when out of the office 12-40 as shown in FIG. 12. Proximity may be detected by headset sensor 12-38 or by comparison of various location based systems as discussed in more detail below or any other proximity detection scheme illustrated by proximity detector 12-44 which may for example monitor communications between wireless headset 12-38 and cell phone 12-26 to detect proximity there between.

The monitored condition may be related to proximity of the headset to one or more locations. For example, headset sensor may include a GPS receiver and another GPS or other location based information system, such as GPS system 12-46, may be used to determine that user 12-20 is in or near a specific location such as a hallway, office, conference room or bathroom. Other systems which use the strength, timing or coding of received signals transmitted between headset 12-28 and known locations can also be used. Similarly, RFID system 12-48 in which an interrogatable tag is located at a known location or on headset 12-28 may also be used.

Presence system 12-36 may estimate from the monitored condition a potential for user 12-20 to receive and immediately respond to a digital instant message from caller 12-18 transmitted by text or speech based digital instant communication systems 12-12 and 12-14. These estimates may be based on rule based information applied to the monitored condition, e.g. various levels for the potential for user 12-28 may be determined by rules applied to one or monitored headset conditions. That is, the potential may be different for the same location depending on whether the user has donned, doffed or docked the headset or is moving while wearing or carrying the phone and or whether the user had done so recently. As one example, user 12-20 may have a low potential for receiving and immediately responding to a digital instant message even if carrying headset 12-28 while in a supervisor's office or even when headset 12-28 is donned while in an elevator, while having a high potential while proximate docking station 12-34 even when headset 12-28 is docked.

The potential may include an estimate of the user's presence, availability and/or willingness to receive and immediately respond to a digital instant message from caller 12-18 based on the identification of the caller or an estimate that the user may (or may not be) willing to do so while in his supervisor's office or in a boardroom. The estimate may be made in response to receipt of a text or speech based digital instant communication by cell phone 12-26, desktop computer 12-22, notebook computer 12-24, desk phone 12-42 or any other equipment associated with the user such as an office computer server or similar equipment. The estimate may also be made before the communication is received, for example, on a continuous or periodic basis.

In operation, for example if user 12-20 is out of office 12-40 but proximate cell phone 12-26 or notebook computer 12-24, an incoming digital instant communication received from networks 12-16 may be automatically directed to user 12-20 via wireless headset 12-28 if the estimated potential for user 12-20 to receive and immediately respond to the incoming communication indicates that the user is likely to immediately respond to the communication.

As one specific example, caller 12-18 may send an instant message (IM) to user 12-20 received by desktop computer 12-22 asking "R U THERE" which may be automatically directed to wireless headset 12-28 in accordance with the estimated potential even if the user is out of office 12-40 and without cell phone 12-26 or notebook computer 12-24. Presence system 12-36, or another appropriate system, may provide an audible message to the user from text associated with the incoming digital instant communication, for example, by converting the text based message to an audible speech message "Are you there?" which may be provided to user 12-20 via wireless headset 12-28 if the estimated potential is that user 12-20 is likely to immediately respond.

User 12-20 may respond by speaking a command phrase such as "Not now" which may be provided as an outgoing message, such as a reply IM to caller 12-18 which may be "Not now but I'll call you as soon as I'm available". Similarly, user 12-20 may speak the command "3 pm" which may then be included in the reply IM as "Call me back at 3 p.m."

Alternately, if when the "R U THERE" IM is received by communications equipment associated with user 12-20 when the estimated potential is that user 12-20 is likely to immediately respond but the headset condition indicates that user 12-20 is not currently wearing the headset 12-28 while remaining proximate headset 12-28, a signal may be provided to the headset, such as a tone or prerecorded message or flashing light or other signal indicating current receipt of an incoming digital instant message. The signal may be perceptible to user 12-20 even if user 12-20 is not wearing headset 12-28. The estimated potential may include the information that user 12-20 is not wearing headset 12-28 but is proximate thereto.

If user 12-20 decides to respond to the incoming digital instant communication by immediately engaging caller 12-18 in a conversation, user 12-20 may respond to the "R U THERE" IM by speaking or otherwise issuing a command such as "Pick Up" which causes a bidirectional voice communication channel, such as a VoIP channel or a standard telephone call via desk phone 12-42 to be opened between caller 12-18 and user 12-20 via wireless headset 12-28.

Figure 12A:
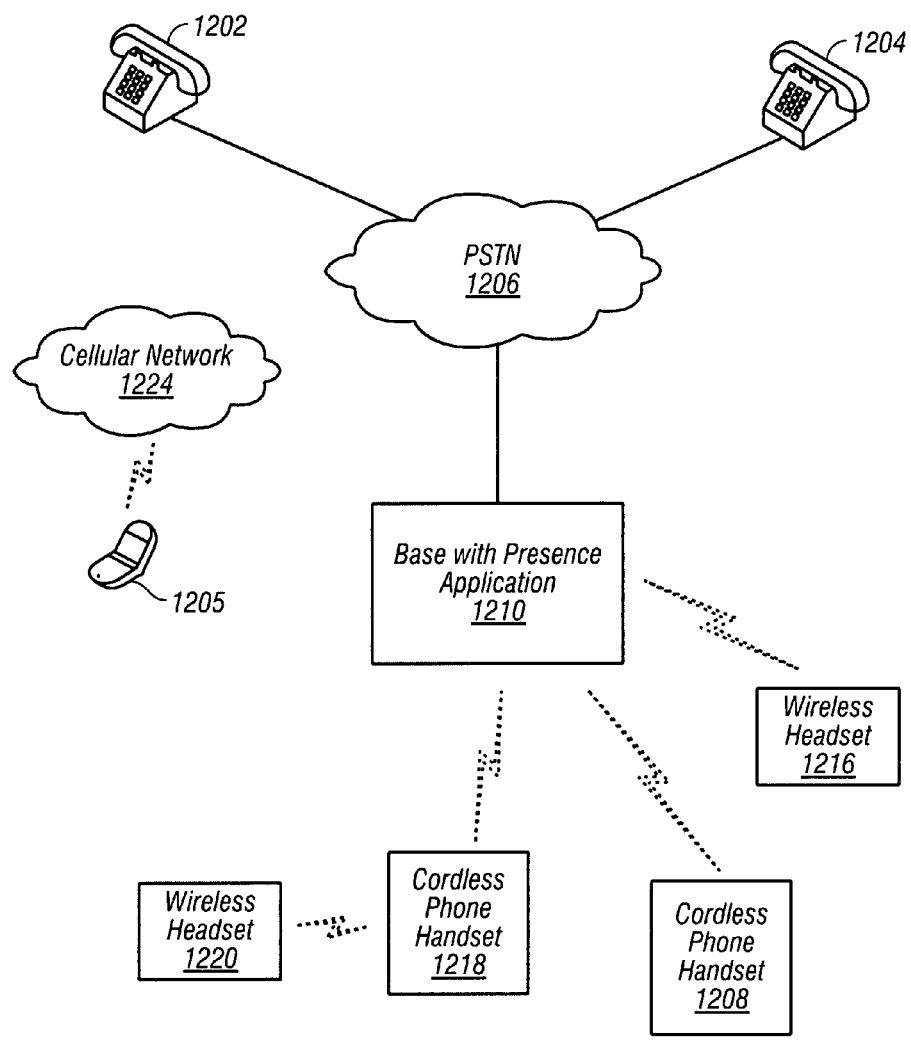
FIG. 12A illustrates a diagram of a presence and communication system in one example of the invention, in which presence information is delivered over a public switched telephone network (PSTN).

FIG. 12A illustrates a diagram of a presence and communication system in one example of the invention, in which presence information is delivered over a landline network such as the public switched telephone network (PSTN). While the term "presence" has various meanings and connotations, the term "presence" is used in the following examples to refer to a user's willingness, availability and/or unavailability to participate in real-time communications and/or means by which the user is currently capable or incapable of engaging in real-time communications. The term presence information (also referred to herein as "presence data") may also refer to the underlying usage characteristics or proximity location used to derive a user's willingness, availability and/ or unavailability to participate in real-time communications and/or means by which the user is currently capable or incapable of engaging in real-time communications The presence and communication system includes a base station with presence application 1210 having a presence application installed thereon. The base station with presence application 1210 (herein after also referred to simply as base station 1210) is coupled to a public switched telephone network (PSTN) 1206. The base station 1210 is capable of wireless communication with one or more wireless devices. In the example illustrated in FIG. 12A, the base station 1210 communicates with a cordless phone handset 1218, cordless phone handset 1208, and wireless headset 1216. Cordless phone handset 1218 may be used with a wireless headset 1220. The term "cordless" is used synonymously with the term "wireless" herein. Fewer or additional devices may communicate with the base station 1210. The base station 1210 is accessible through the PSTN 1206 by either landline telephones or cellular telephones. In the example illustrated in FIG. 12A, a cellular telephone 1205, telephone 1202, or telephone 1204 may connect to the base station 1210.

Figure 13A:
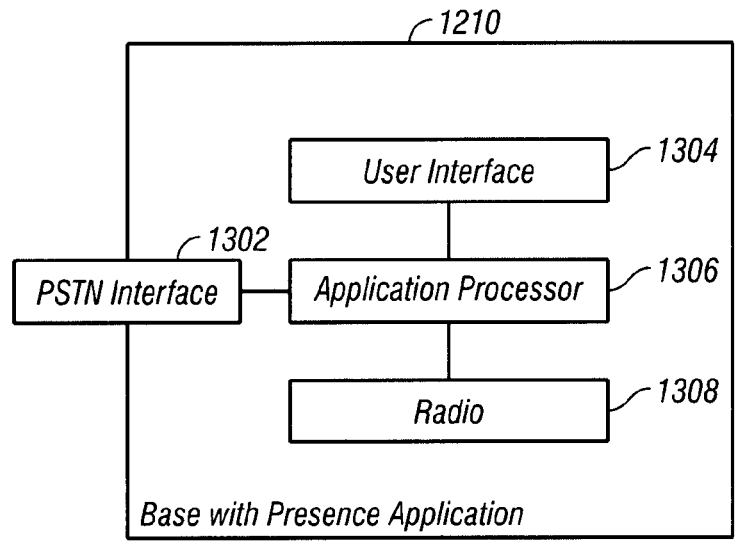
FIG. 13A illustrates a simplified block diagram of the hardware components of a base having a presence server in one example of the invention.
Figure 13B:
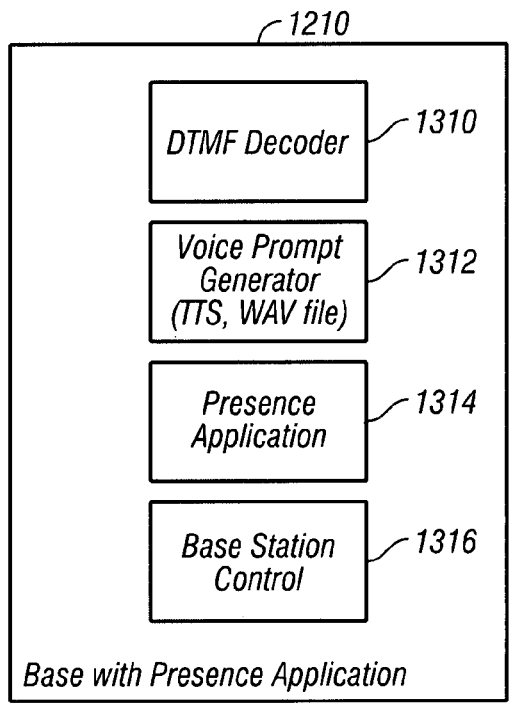
FIG. 13B illustrates a simplified block diagram of the software components of a base having a presence server in one example of the invention.

FIGS. 13A and 13B illustrate simplified block diagrams of the hardware and software components, respectively, of base station 1210 in one example of the invention. Base station 1210 includes a PSTN interface 1302 for coupling to PSTN 1206, an application processor 1306, a user interface 1304, and radio 1308 capable of communication with one or more wireless devices. Referring to FIG. 13B, base station 1210 includes a DTMF decoder module 1310, voice prompt generator module 1312, presence application 1314, and base station control module 1316.

The presence application 1314 receives and processes presence information from one or more wireless devices. The presence application 1314 includes a presence monitoring program adapted to receive and process presence information associated with the one or more wireless headsets or telephones, and a caller interaction program for communicating a plurality of user selectable options associated with the presence information to a far end caller over the PSTN and responsively receiving and processing a far end caller selected option. In one example, the presence application 1314 receives proximity and usage characteristics of the one or more wireless headsets or telephones. For each wireless headset or telephone, the presence monitoring program stores the proximity and usage characteristic information in an updatable proximity and usage record. The presence application 1314 uses the proximity and usage characteristic record to generate presence information about a user. This generated presence information is used by the caller interaction program to provide a far end caller with a plurality of user selectable options associated with the presence information to a far end caller over the PSTN. In one example, the caller interaction program generates a plurality of voice prompts.

In one example, the base station with presence application 1314 operates as a "presence server" in the manner described above in reference to FIG. 6. The presence server is configured to store an updatable record of the proximity and usage state of the wireless headset 1216, cordless phone handset 1208, cordless phone handset 1218, or wireless headset 1220. The presence server uses the proximity and usage state record to generate and report presence information of the users of these devices or a "shift" in presence status of the user. For example, presence information may be reported that a user has shifted from using the wireless headset to using an alternate mode of communicating.

In operation, voice prompt generator module 1312 outputs voice prompts to callers. For example, such voice prompts include presence information presented in a menu of options selectable by the caller using DTMF or voice response. DTMF decoder module 1310 decodes DTMF signals corresponding to user selections at the user telephone. In a further example, base station 1210 includes a voice recognition module for identifying a user voice response.

Figure 14A:
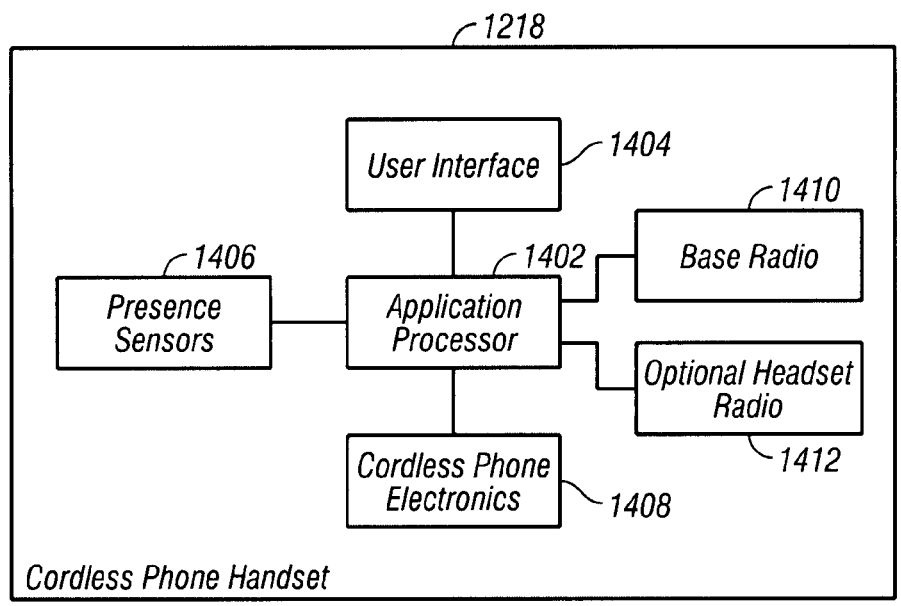
FIG. 14A illustrates a simplified block diagram of the hardware components of a cordless phone handset in one example of the invention.
Figure 14B:
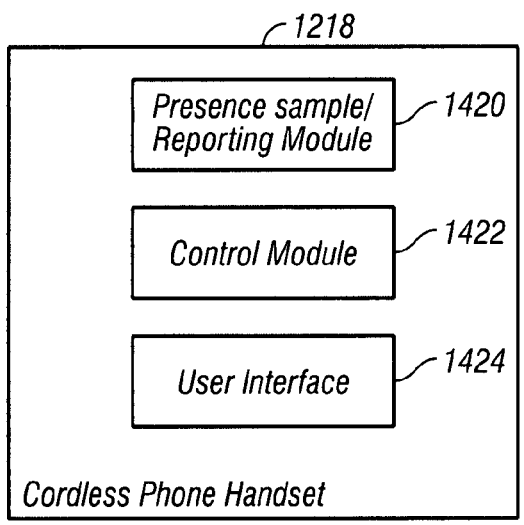
FIG. 14B illustrates a simplified block diagram of the software components of a cordless phone handset in one example of the invention.

FIGS. 14A and 14B illustrate simplified block diagrams of the hardware and software components respectively of the cordless phone handset 1218 in one example of the invention. Cordless phone handset 1218 includes an application processor 1402, user interface 1404, presence sensors 1406, cordless phone electronics 1408, base radio 1410, and optional headset radio 1412. Presence sensors 1406 may include sensors or detectors such as motion detectors or other sensors or detectors described herein. For example, these various types of sensors and detectors can be employed to determine whether the handset is being carried or is stationary.

Base radio 1410 transmits presence information and user communications to base station 1210. Optional headset radio 1412 receives presence information and communications from a wireless headset, as described below in reference to FIGS. 15A and 15B. Referring to FIG. 14B, cordless phone handset 1218 includes a presence sampling and reporting module 1420, control module 1422, and user interface 1424. Presence sampling and reporting module utilizes presence sensors 1406 to gather presence information. Cordless phone handset 1218 transmits presence information for both cordless phone handset 1218 and wireless headset 1220 to the base station.

Figure 15A:
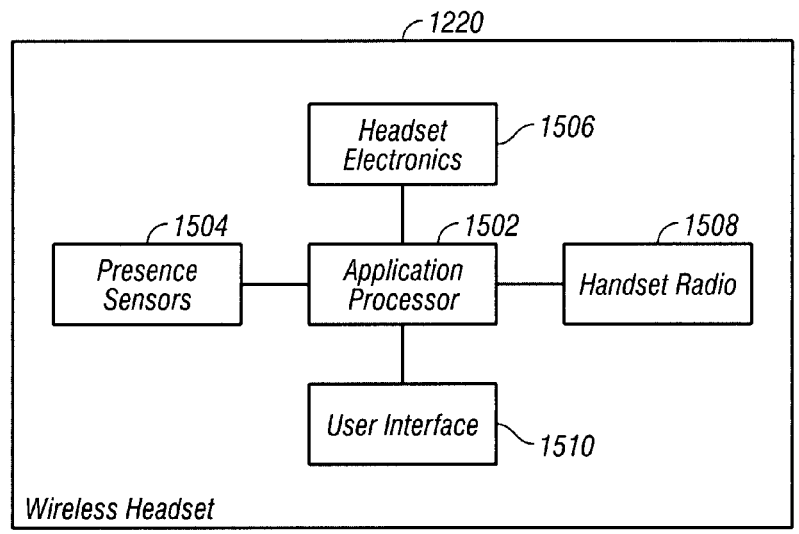
FIG. 15A illustrates a simplified block diagram of the hardware components of a wireless headset, in which the wireless headset is in communication with a cordless phone handset.
Figure 15B:
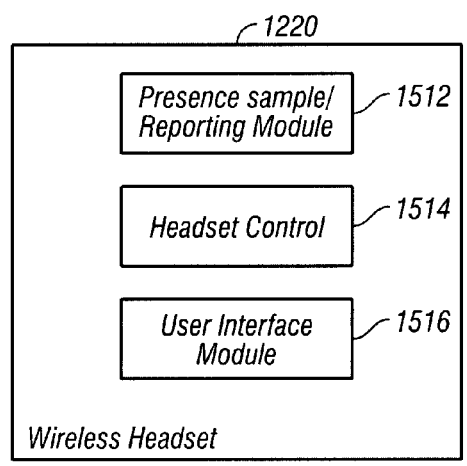
FIG. 15B illustrates a simplified block diagram of the software components of the wireless headset shown in FIG. 15A.

FIGS. 15A and 15B illustrate a simplified block diagram of the hardware and software components, respectively, of a wireless headset 1220, in which the wireless headset is in communication with a cordless phone handset 1218. Wireless headset 1220 includes an application processor 1502, presence sensors 1504, headset electronics 1506, handset radio 1508, and user interface 1510. Presence sensors 1504 include sensors such as motion detectors as described herein above as described herein above. For example, these sensors or detectors can be employed to determine whether the wireless headset 1220 is donned or doffed and whether the headset is being carried. For example, an accelerometer, such as that described in FIG. 3 above, may be used to determine whether the wireless headset 1220 is being carried. The accelerometer may consist of a mass affixed to a piezoelectric crystal. Other motion detection techniques may also be used for this purpose, and include for example, a magnet and a coil moving relative to one another.

Techniques that can be used to determine whether the headset is donned or doffed include, but are not limited to, utilizing one or more of the following sensors or detectors integrated in the wireless headset 1220 and/or disposed on or within one or more of the headphones of the wireless headset 1220: a thermal or infrared sensor, skin resistance sensor, capacitive touch sensor or circuit, micro-switch, inductive proximity sensor or switch, pyroelectric sensor, magnetic sensor, piezoelectric-based sensor, and motion detector. Further details regarding these sensors and detectors can be found in the commonly assigned and co-pending U.S. patent application entitled "Donned and Doffed Headset State Detection", which was filed on Oct. 2, 2006, and which is hereby incorporated into this disclosure by reference Referring to FIG. 15B, wireless headset 1220 includes presence sampling and reporting module 1512, headset control module 1514, and user interface module 1516. Presence sampling and reporting module 1512 utilizes presence sensors 1504 to gather presence data. The presence data is sent to cordless phone handset 1218 using handset radio 1508.

Figure 16:
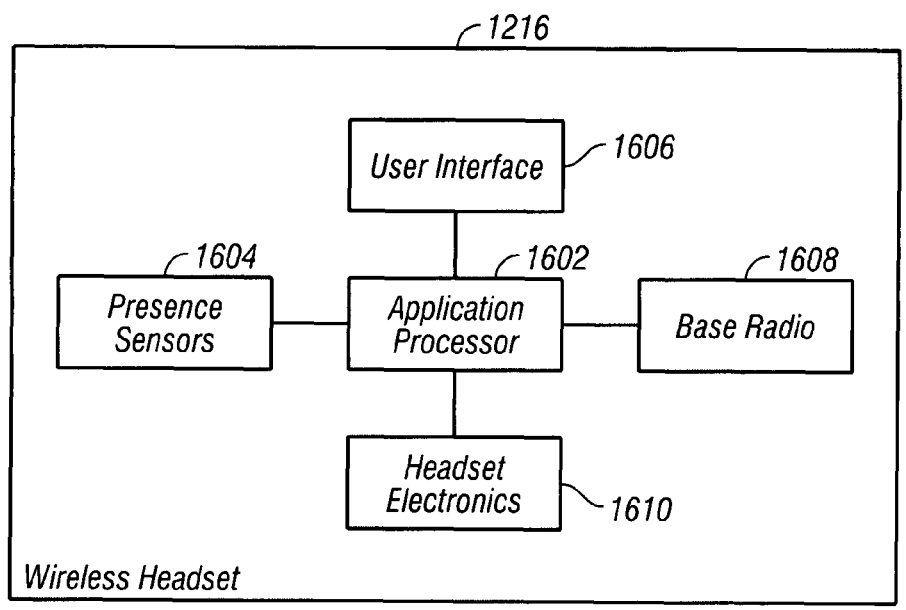
FIG. 16 illustrates a simplified block diagram of the hardware components of a wireless headset in one example of the invention, in which the wireless headset is in communication with a base having a presence server.

FIG. 16 illustrates a simplified block diagram of the hardware components of a wireless headset 1216 in one example of the invention, in which the wireless headset 1216 is in direct communication with a base station 1210. Wireless headset 1216 includes an application processor 1602, presence sensors 1604, user interface 1606, base radio 1608, and headset electronics 1610. Operation of wireless headset 1216 is similar to that of wireless headset 1220, with the exception that base radio 1608 communicates presence information to base station 1210.

Referring again to FIG. 12A, in operation, usage characteristics and proximity information of cordless phone handset 1218, cordless phone handset 1208, wireless handset 1216, and wireless headset 1220 are transmitted to or derived at the base station 1210. Gathering of the usage characteristics and proximity information is performed using the techniques described herein above. Such usage characteristics and proximity information include, but are not limited to whether the one or more wireless headsets or telephones are donned or doffed, are in a charging station, or are being carried but not worn. In one example, proximity information is determined by measuring strengths of signals received by the one or more wireless headsets or telephones. Proximity information may be related to a proximity between the one or more wireless headsets or telephones and a near end user, related to the proximity between the one or more wireless headsets or telephones to the base station, or related to the proximity between the one or more wireless headsets or telephones to one or more known locations.

Additional presence information may be derived or generated from the usage characteristics and proximity information. Such additional presence information may include, for example, whether the user is available to receive a text message or is available to receive a telephone call.

The presence information is communicated to a caller at a telephone 1202 or telephone 1204 over PSTN 1206 by the base station 1210. Presence information may also be communicated to a caller at a cellular telephone 1205 over PSTN 1206 and cellular network 1224. In one example, the presence information is output in the form of user selectable options using a series of generated voice prompts. Base station 1210 receives a user selection via DMTF responsive to the communicated presence information, and performs the user selected option. For example, the base station 1210 may route a telephone call to a user selected wireless headset or cordless handset responsive to receiving the user selected option.

Figure 17A:
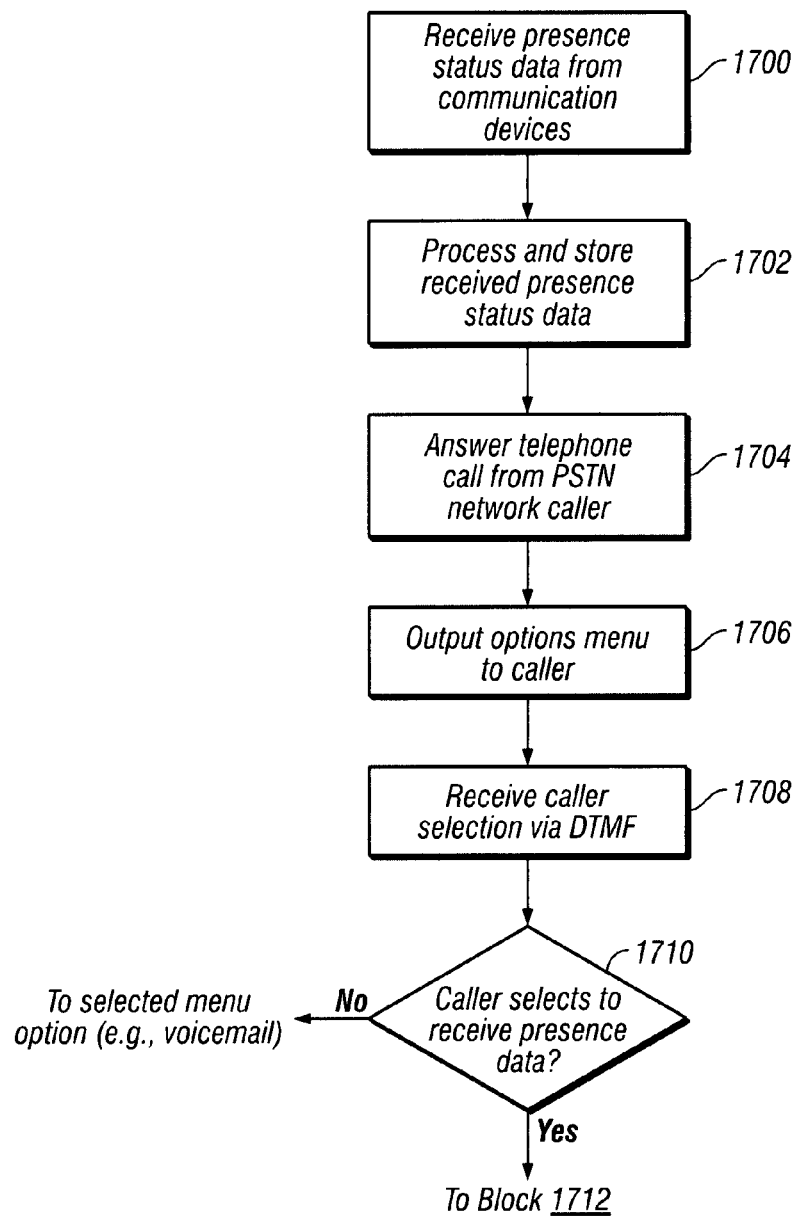
Figure 17B:
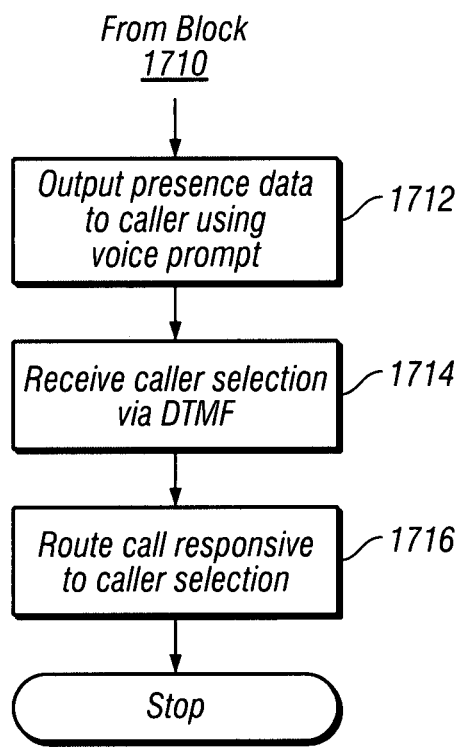

FIGS. 16 and 17B are a flowchart illustrating an exemplary process by which the system in FIG. 12A operates to gather and deliver presence information over a public switched telephone network (PSTN), in accordance with an embodiment of the present invention. At block 1700, presence data from one or more communication devices is received. At block 1702, the presence data is processed and stored. For example, the presence data received may be in the form of usage and proximity data which is further processed to generate additional presence information. At block 1704, a telephone call is received from a PSTN caller. At block 1706, an options menu is output to the PSTN caller. At block 1708, a PSTN caller selection is received via a DTMF signal. At decision block 1710, it is determined whether the PSTN caller selected to receive presence data. If no, the process proceeds to the selected menu option. For example, the PSTN caller may be directed to voicemail. If yes at decision block 1710, presence data is output to the PSTN caller using voice prompts. For example, the presence data may include which users are available. At block 1714, the PSTN caller selection is received via a DTMF signal. At block 1716, the call is routed to the selected device responsive to the PSTN caller selection.

Figure 18:
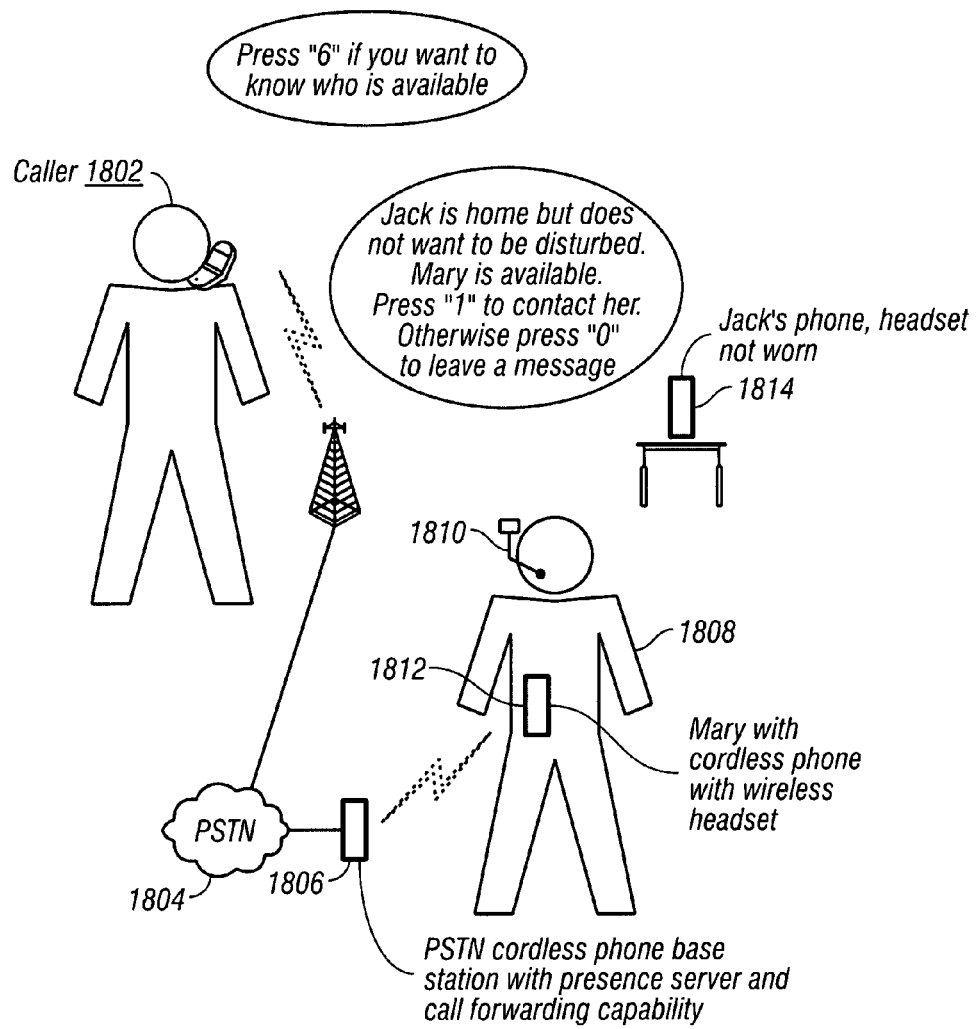
FIG. 18 illustrates a usage state in which a first user's phone and headset are not worn and a second user's phone and headset are worn, in accordance with an aspect of the invention.

FIG. 18 illustrates a usage state in which a first user's phone and headset are not worn and a second user's phone and headset are worn, in accordance with an aspect of the invention. A caller 1802 calls a base station with presence server 1806 via PSTN 1804. The base station with presence server 1806 receives and processes presence information about a user 1808 (Mary), where Mary has a wireless headset 1810 and cordless phone 1812. The base station with presence server 1806 also receives and processes presence information abut a user (Jack) having a cordless phone 1814 and wireless headset (not shown). In the example shown in FIG. 18, the base station with presence server 1806 outputs a voice prompt to caller 1802 to "Press '6' if you want to know who is available". If caller 1802 presses '6', then base station with presence server 1806 outputs presence information to caller 1802 in the form of a voice prompt "Jack is home, but does not want to be disturbed. Mary is available. Press "1" to contact her. Otherwise press '0' to leave a message".

Figure 19:
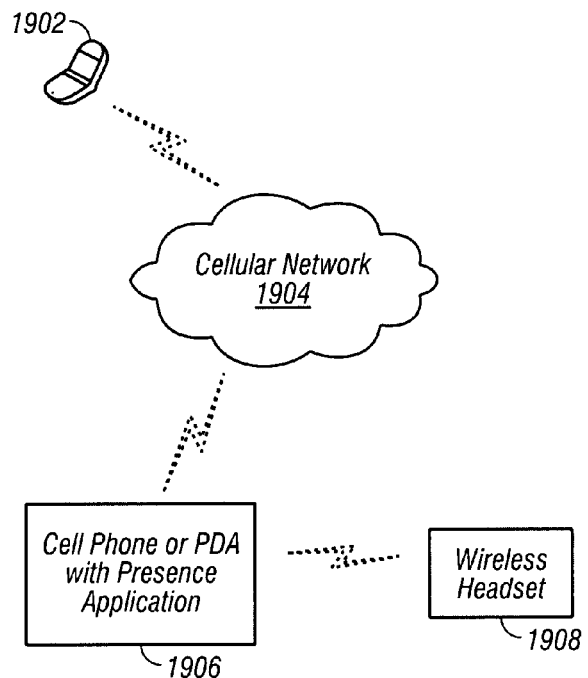
FIG. 19 illustrates a diagram of a presence and communication system in one example of the invention, in which presence information is delivered over a cellular network.

FIG. 19 illustrates a diagram of a presence and communication system in one example of the invention, in which presence information is delivered over a cellular network. The presence and communication system includes a cell phone or PDA with presence application 1906. The cell phone or PDA with presence application 1906 (hereinafter referred to as "cell phone or PDA 1906") may operate as a presence server as described herein. The cell phone or PDA 1906 is coupled to a cellular network 1904. The cell phone or PDA 1906 is capable of wireless communication with a wireless headset 1908. In the example illustrated in FIG. 19, a cellular telephone 1902 connects to the cell phone or PDA 1906.

Figure 20A:
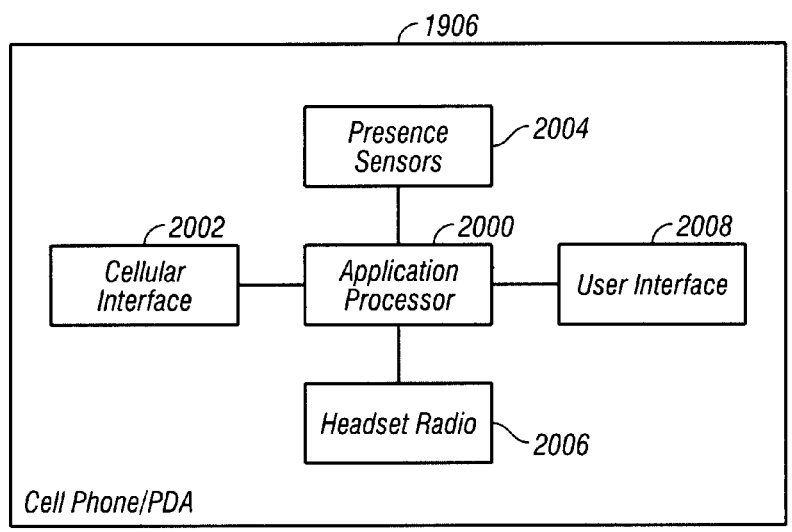
FIG. 20A illustrates a simplified block diagram of the hardware components of a cell phone or PDA having a presence server in one example of the invention, in which the cell phone or PDA utilizes presence sensors.
Figure 20B:
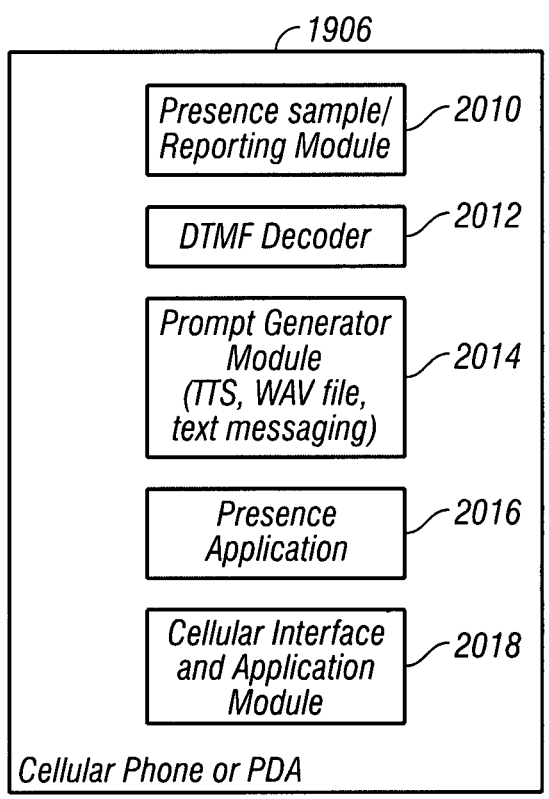
FIG. 20B illustrates a simplified block diagram of the software components of a cell phone or PDA having a presence server in one example of the invention, in which the cell phone or PDA utilizes presence sensors.

FIGS. 20A and 20B illustrate a simplified block diagram of the hardware and software components respectively of a cell phone or PDA 1906 in one example of the invention, in which the cell phone or PDA 1906 utilizes presence sensors.

Cell Phone or PDA 1906 includes a cellular interface 2002 for coupling to cellular network 1904, an application processor 2000, a user interface 2008, and headset radio 2006 capable of communication with a wireless headset. Referring to FIG. 20B, Cell Phone or PDA 1906 includes a presence sample/reporting module 2010, DTMF decoder module 2012, voice prompt generator module 2014, presence application 2016, and cellular interface and application module 2018.

The presence application 2016 receives and processes presence information from a wireless headset and/or information from the cellular phone or PDA 1906 itself. The presence application 2016 includes a presence monitoring program adapted to receive and process presence information associated with the wireless headset or the cellular phone or PDA 1906, and a caller interaction program for communicating a plurality of user selectable options associated with the presence information to a far end caller over the cellular network and responsively receiving and processing a far end caller selected option. In one example, the presence application 2016 receives proximity and usage characteristics of the wireless headset or cellular phone or PDA 1906. For the wireless headset or cellular phone or PDA 1906, the presence monitoring program stores the proximity and usage characteristic information in an updatable proximity and usage record. The presence application 2016 uses the proximity and usage characteristic record to generate presence information about a user. This generated presence information is used by the caller interaction program to provide a far end caller with a plurality of user selectable options associated with the presence information to a far end caller over the cellular network. In one example, the caller interaction program generates a plurality of voice prompts.

In one example, the cell phone or PDA 1906 operates as a "presence server" in the manner described above in reference to FIG. 6. The presence server is configured to store an updatable record of the proximity and usage state of the wireless headset 1908 and cell phone or PDA 1906. The presence server uses the proximity and usage state record to generate and report presence information of the users of these devices or a "shift" in presence status of the user. In operation, voice prompt generator module 2014 outputs voice prompts to callers. For example, such voice prompts include presence information presented in a menu of options selectable by the caller using DTMF or voice response. DTMF decoder module 2012 decodes DTMF signals corresponding to user selections at the user telephone. In a further example, cell phone or PDA 1906 includes a voice recognition module for identifying a user voice response.

Figure 21A:
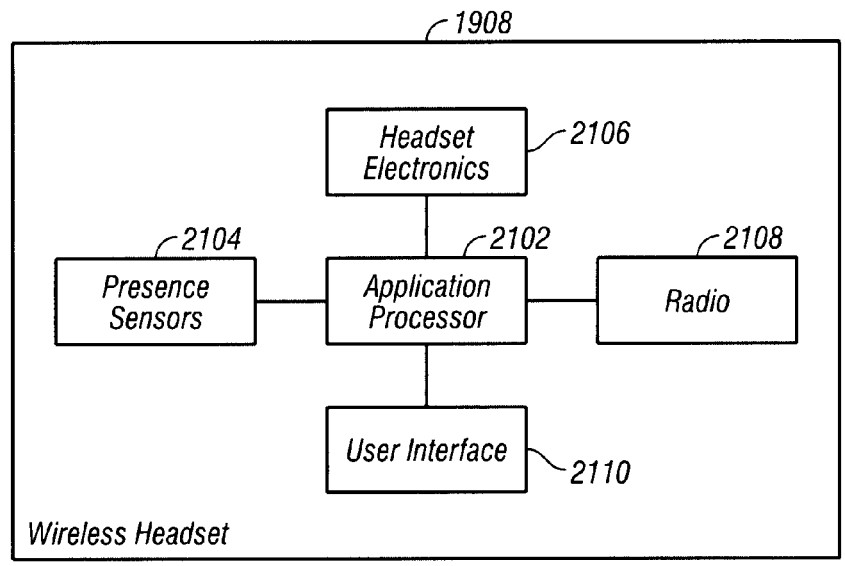
FIG. 21A illustrates a simplified block diagram of the hardware components of a wireless headset, in which the wireless headset is in communication with a cell phone or PDA.
Figure 21B:
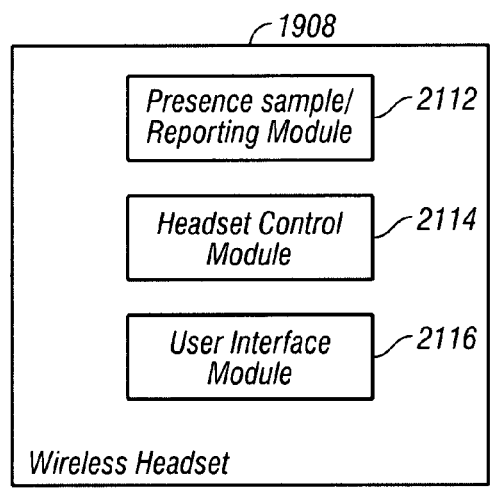
FIG. 21B illustrates a simplified block diagram of the software components of the wireless headset shown in FIG. 21A.

FIGS. 21A and 21B illustrate simplified block diagrams of the hardware and software components respectively of a wireless headset 1908, in which the wireless headset is in communication with a cell phone or PDA. Wireless headset 1908 includes an application processor 2102, presence sensors 2104, headset electronics 2106, radio 2108, and user interface 2110. Presence sensors 2104 include sensors or detectors as described above in reference to wireless headset 1220.

Referring to FIG. 21B, wireless headset 1908 includes presence sampling and reporting module 2112, headset control module 2114, and user interface module 2116. Presence sampling and reporting module 2112 utilizes presence sensors 2104 to gather presence data. The presence data is sent to cell phone or PDA 1906 using radio 2108.

Referring again to FIG. 19, presence information is communicated to a caller at cellular telephone 1902 over cellular network 1904 by the cell phone or PDA 1906. In one example, the presence information is output in the form of user selectable options using a series of generated voice prompts. Cell phone or PDA 1906 receives a user selection via DMTF responsive to the communicated presence information, and performs the user selected option. For example, the cell phone or PDA 1906 may route a telephone call to a user selected wireless headset 1908 responsive to receiving the user selected option.

Figure 22A:
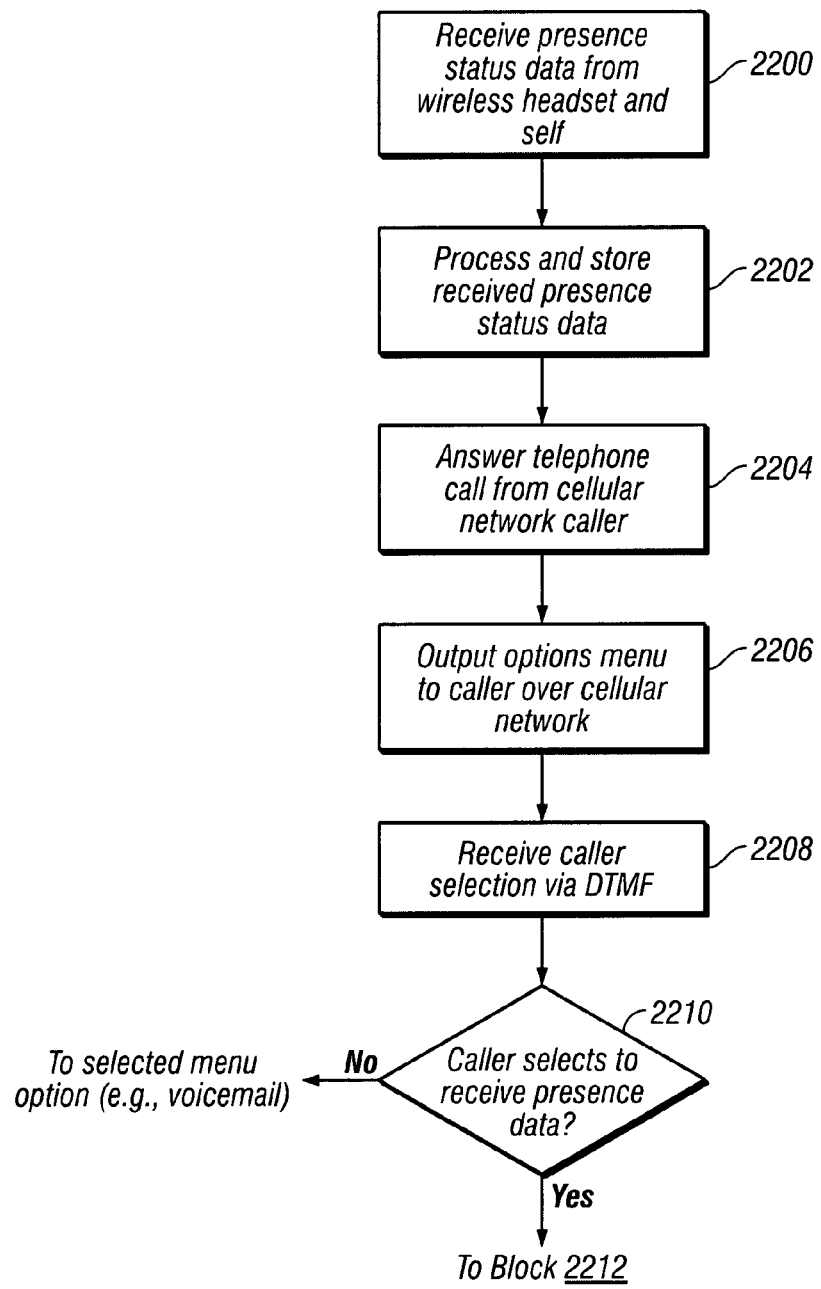
FIGS. 22A and 22B are a flowchart illustrating an exemplary process by which the system in FIG. 19 operates to gather and deliver presence information over a cellular network, in accordance with an embodiment of the present invention.
Figure 22B:
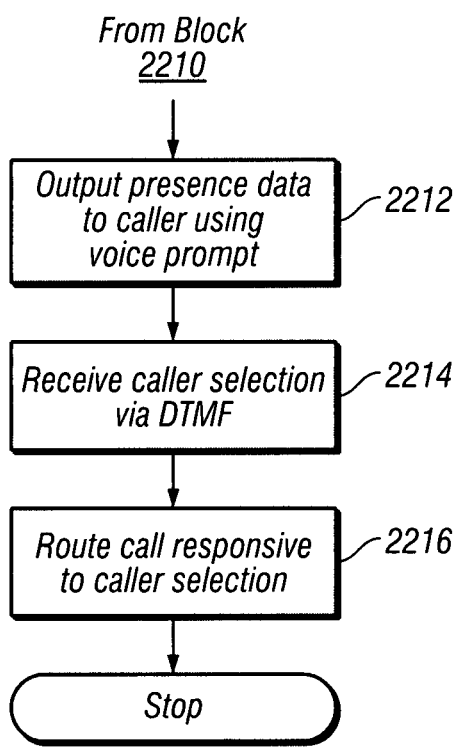

FIGS. 22A and 22B are a flowchart illustrating an exemplary process by which the system in FIG. 19 operates to gather and deliver presence information over a cellular network, in accordance with an embodiment of the present invention.

At block 2200, presence data from either an associated wireless headset or the cell phone or PDA itself is received. At block 2202, the presence data is processed and stored. For example, the presence data received may be in the form of usage and proximity data which is further processed to generate additional presence information. At block 2204, a telephone call is received from a cellular network caller. At block 2206, an options menu is output to the cellular network caller. At block 2208, a cellular network caller selection is received via a DTMF signal. At decision block 2210, it is determined whether the cellular network caller selected to receive presence data. If no, the process proceeds to the selected menu option. For example, the cellular network caller may be directed to voicemail. If yes at decision block 2210, presence data is output to the cellular network caller using voice prompts. For example, the presence data may include which users are available. At block 2214, the cellular network caller selection is received via a DTMF signal. At block 2216, the call is routed to the selected device responsive to the cellular network caller selection.

Figure 23:
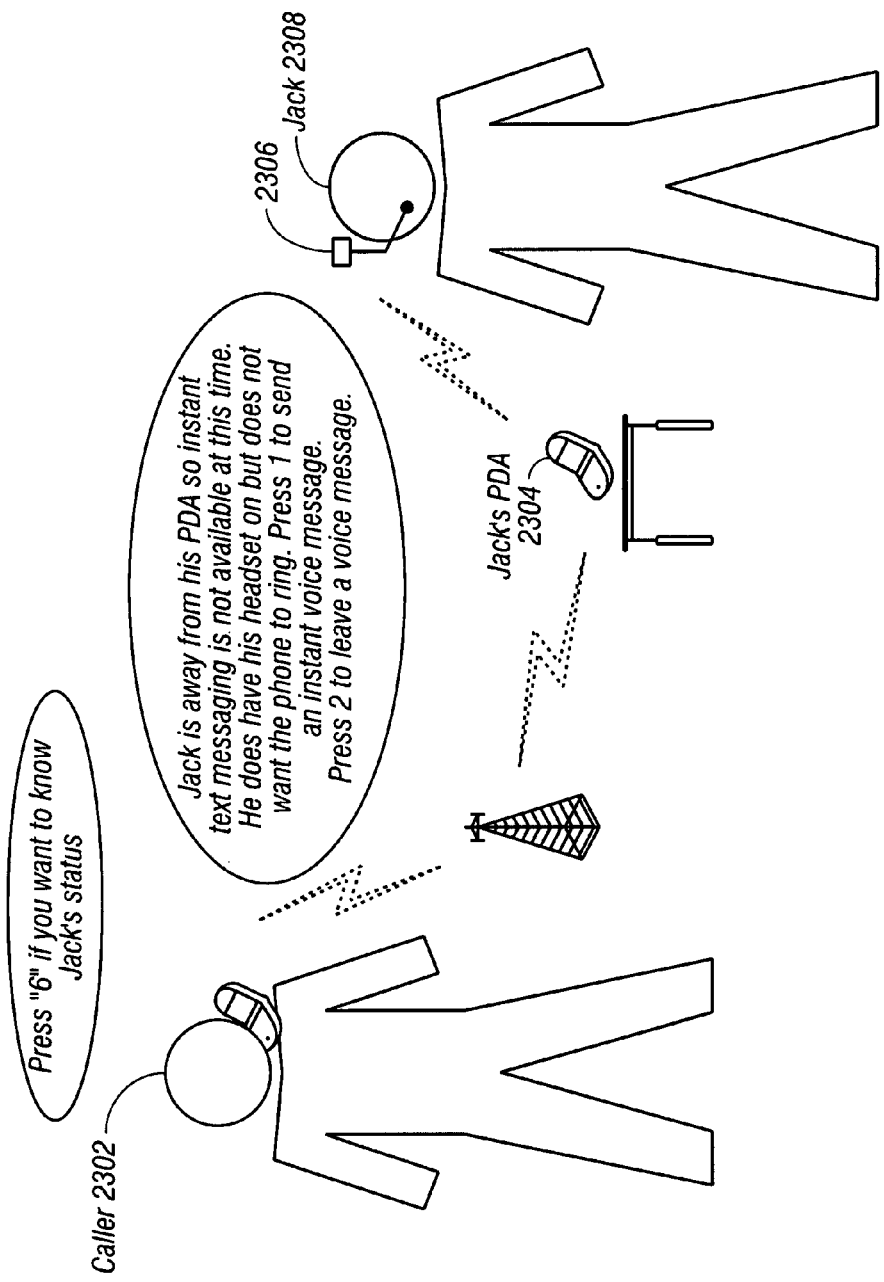
FIG. 23 illustrates a usage state in which a user is away from the user's PDA and not available for instant messaging, but is wearing his headset, in accordance with an aspect of the invention.

FIG. 23 illustrates a usage state in which a user is away from the user's PDA and not available for instant messaging, but is wearing his headset, in accordance with an aspect of the invention. A caller 2302 calls a PDA 2304 via a cellular network. The PDA 2304 receives and processes presence information about a user 2308 (Jack), where Jack has a wireless headset 2306. In the example shown in FIG. 23, the PDA 2304 outputs a voice prompt to caller 2302 to "Press '6' if you want to know Jack's status". If caller 2302 presses '6', then PDA 2304 outputs presence information to caller 2302 in the form of a voice prompt "Jack is away from his PDA so instant text messaging is not available at this time. He does have his headset on, but does not want the phone to ring. Press 1 to send an instant voice message. Press 2 to leave a voice message". The caller 2302 could also be calling from a landline phone to the cellular network for this embodiment of the invention.

FIGS. 24-27 illustrate various usage states in which a private branch exchange (PBX) or PBX-IP gateway are coupled to the PSTN, as is typically used in an office telecommunications environment. In these usage states, presence information is delivered from a telephone base unit connected to the PBX, the PBX directly, or from a computer network via a PBX-IP gateway to the PBX. In FIGS. 24-27, the user is shown calling from a cell phone. There is no reason that the call could not be placed from a land-line as well.

Figure 24:
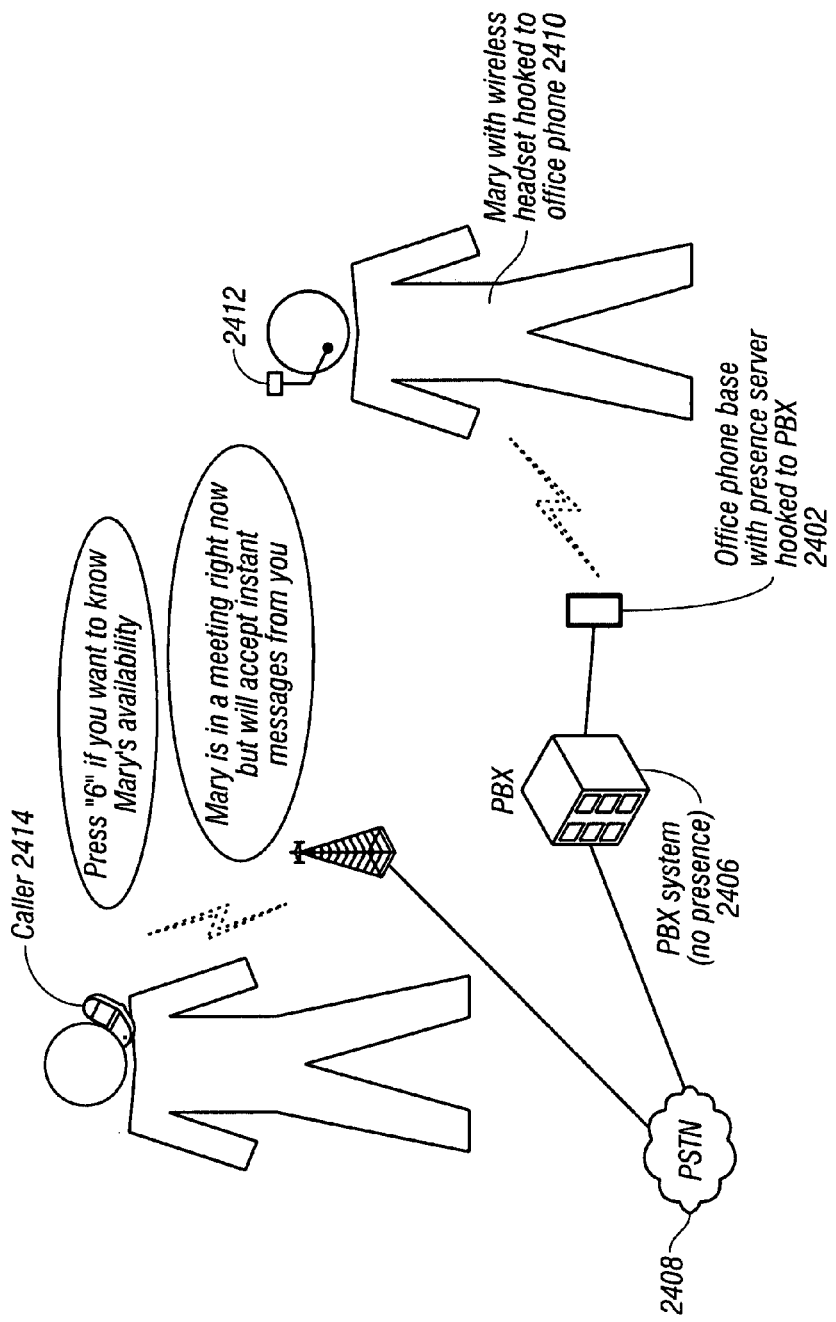
FIG. 24 illustrates a usage state in which an office phone base station with presence server is connected to a PBX.

FIG. 24 illustrates a usage state in which an office phone base station with presence server 2402 is connected to a PBX 2406. PBX 2406 is connected to PSTN 2408. A caller 2414 calls an office phone base station with a presence server 2402 having a presence application via PSTN 1804 and PBX 2406. The office phone base station with presence server 2402 receives and processes presence information about a user 2410 (Mary), where Mary has a wireless headset 2412. The office phone base station with presence server 2402 may also receive and processes presence information about additional users (not shown). In the example shown in FIG. 24, the office phone base station with presence server 2402 outputs a voice prompt to caller 2414 to "Press '6' if you want to know Mary's availability". If caller 2414 presses '6', then office phone base station with presence server 2402 outputs presence information to caller 2414 in the form of a voice prompt "Mary is in a meeting right now but will accept instant messages from you".

Figure 25:
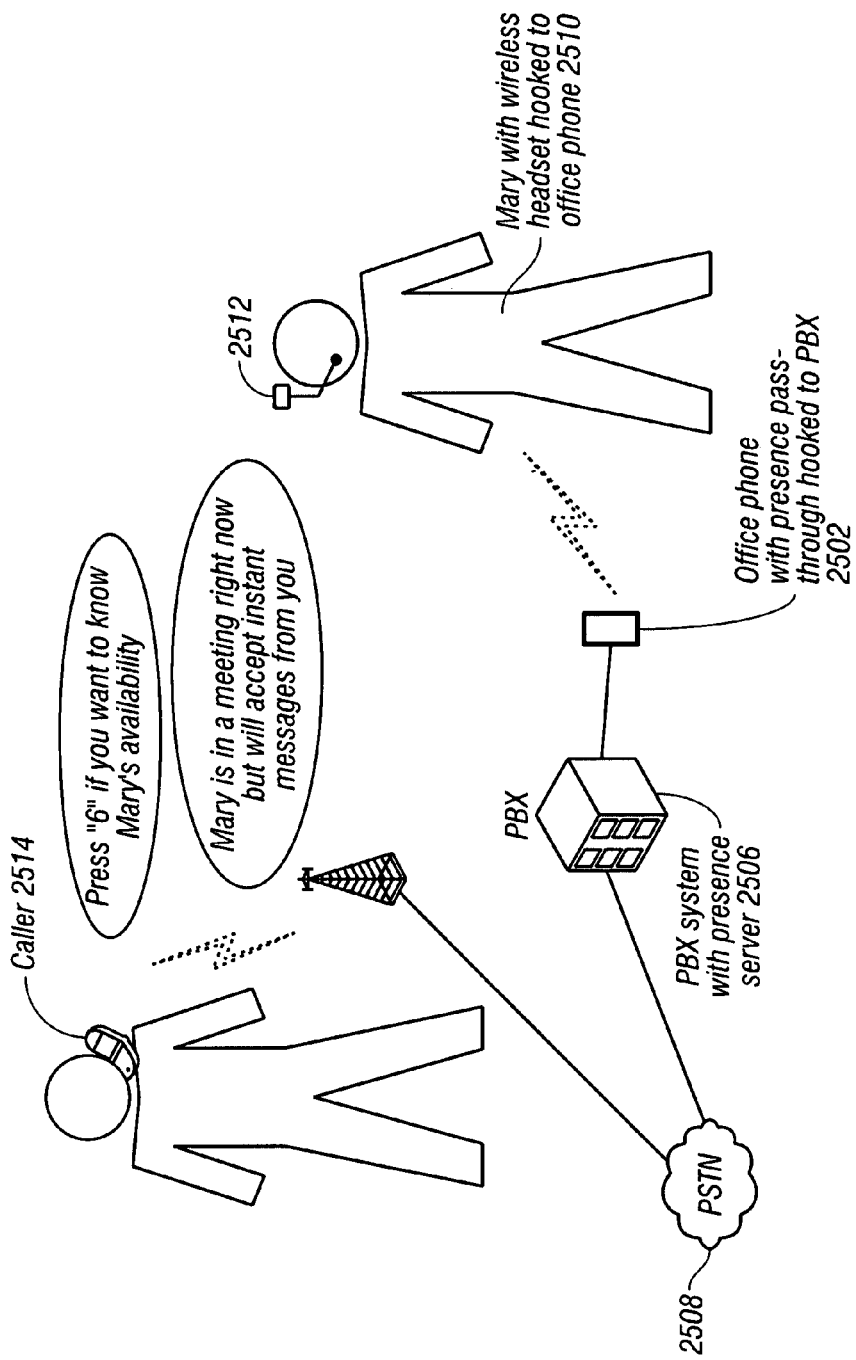
FIG. 25 illustrates a usage state in which an office phone base station is connected to a PBX with a presence server having a presence application.

FIG. 25 illustrates a usage state in which an office phone base station is connected to a PBX with a presence server 2506 having a presence application. PBX with presence server 2506 is connected to PSTN 2508. A caller 2514 calls an office phone base station 2502 with presence pass through via PSTN 1804 and PBX with presence server 2506. The office phone base station 2502 receives and processes presence information about a user 2510 (Mary), where Mary has a wireless headset 2512. This presence information is sent to the presence server residing at PBX with presence server 2506. The office phone base station 2502 may also receive and processes presence information about additional users (not shown). PBX with presence server 2506 responds to DTMF requests and generates appropriate voice prompts. In the example shown in FIG. 25, the PBX with presence server 2506 outputs a voice prompt to caller 2514 to "Press '6' if you want to know Mary's availability". If caller 2514 presses '6', then PBX with presence server 2506 outputs presence information to caller 2514 in the form of a voice prompt "Mary is in a meeting right now but will accept instant messages from you".

Figure 26:
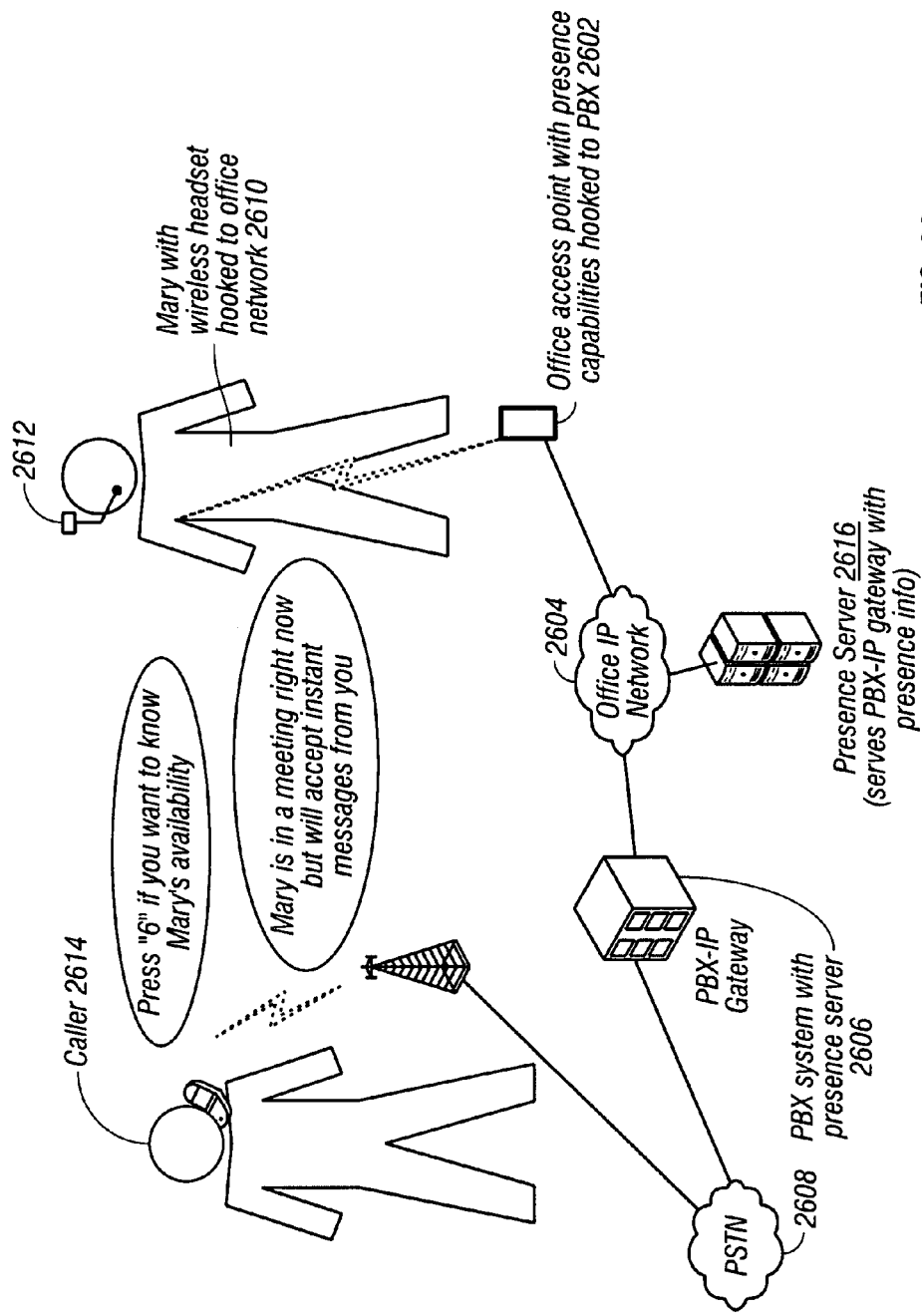
FIG. 26 illustrates a usage state in which an office access point is connected to a PBX-IP gateway with presence server via an office IP network.

FIG. 26 illustrates a usage state in which an office access point is connected to a PBX-IP gateway with presence server 2606 via an office IP network 2604. PBX-IP gateway with presence server 2606 is connected to PSTN 2608. A presence server 2616 with a presence application is also connected to Office IP network 2604. The presence server 2616 serves PBX-IP gateway with presence server 2606 with presence information. A caller 2614 calls an office access point 2602 with presence capabilities. The office access point 2602 receives presence information about a user 2610 (Mary), where Mary has a wireless headset 2612. This presence information is sent to the presence server 2616 connected to Office IP network 2604. This presence information is then sent to the presence server residing on PBX-IP gateway with presence server 2606. The presence server 2616 may also receive and processes presence information about additional users (not shown). PBX-IP gateway with presence server 2606 handles outside calls coming through PSTN 2608 requesting presence information, and handles DTMF requests from caller 2614 and voice prompt generation.

Figure 27:
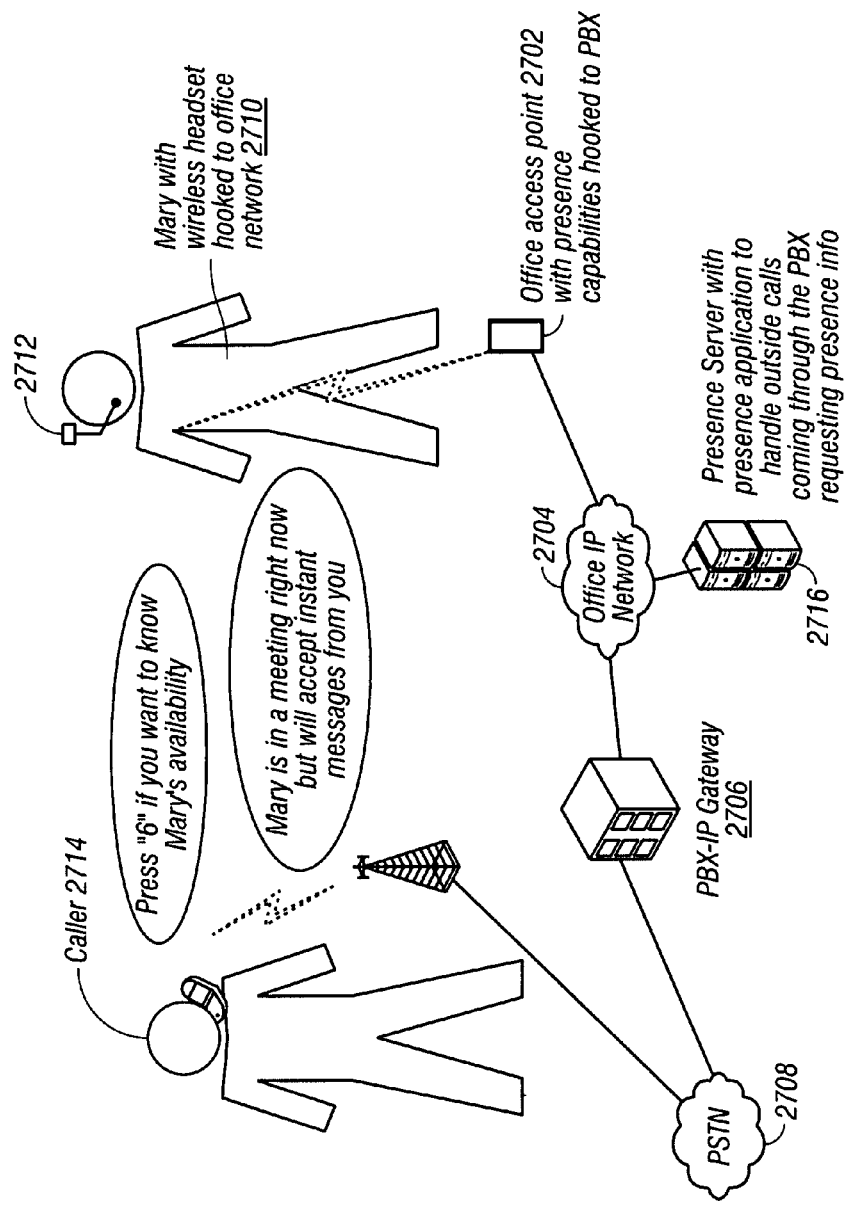
FIG. 27 illustrates a usage state in which an office access point is connected to a PBX-IP gateway via an office IP network.

In the example shown in FIG. 26, the presence server 2606 outputs a voice prompt to caller 2614 to "Press '6' if you want to know Mary's availability". If caller 2614 presses '6', then presence server 2606 outputs presence information to caller 2614 in the form of a voice prompt "Mary is in a meeting right now but will accept instant messages from you". In FIG. 26, the PBX IP gateway handles the voice prompts and DTMF detection. The IP presences server provides the information that the PBX ships out. Futhermore, additional PBX office phones with presence info can be attached directly to the gateway FIG. 27 illustrates a usage state in which an office access point is connected to a PBX-IP gateway 2706 via an office IP network 2704. PBX-IP gateway 2706 is connected to PSTN 2708. A presence server 2716 is also connected to Office IP network 2704. The presence server 2716 serves PBX-IP gateway 2706 with presence information. A caller 2714 calls an office access point 2702 with presence capabilities. The office access point 2702 receives presence information about a user 2710 (Mary), where Mary has a wireless headset 2712. This presence information is sent to the presence server 2716 connected to Office IP network 2704. The presence server 2716 may also receive and processes presence information about additional users (not shown). Presence server 2716 handles outside calls coming through PBX-IP gateway 2706 requesting presence information. Presence server 2716 handles DTMF requests from caller 2714 and voice prompt generation. PBX-IP gateway 2706 acts to pass the presence information between PSTN 2708 and the presence server 2716. In this example, the PBX-IP gateway may be referred to as "dumb" in that it does nothing but translate the format of the data, but the actual handling of the DTMF digits and voice prompts are generated in the presence server 2716. In the example shown in FIG. 27, the presence server 2716 outputs a voice prompt to caller 2714 to "Press '6' if you want to know Mary's availability". If caller 2714 presses '6', then presence server 2716 outputs presence information to caller 2714 in the form of a voice prompt "Mary is in a meeting right now but will accept instant messages from you". In this configuration, additional office phones can be added to the PBX gateway, but it cannot handle presence information from the phones.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method of reporting presence characteristics over a public switched telephone network (PSTN) communications network comprising:
   receiving and processing at a base station a plurality of presence information from one or more wireless headsets or wireless telephones, wherein the base station is coupled to a PSTN network;
   receiving a telephone call at the base station over the PSTN network from a far end caller;
   outputting from the base station a plurality of caller selectable options associated with the plurality of presence information to the far end caller; and
   receiving a far end caller selected option.

2. The method of claim 1, wherein the one or more wireless headsets or wireless telephones comprise at least one member selected from the group consisting of: a first wireless handset associated with the base station, a second wireless handset associated with the base station, a first wireless headset associated with the base station, or a second wireless headset associated with the first wireless handset.

3. The method of claim 1, further comprising routing the telephone call to a selected wireless headset or a selected wireless telephone responsive to receiving the far end caller selected option.

4. The method of claim 1, wherein receiving a far end caller selected option comprises receiving a dual tone multi-frequency (DTMF) signal sent from the far end caller.

5. The method of claim 1, further comprising generating a plurality of voice prompts.

6. The method of claim 1, wherein the plurality of presence information associated with the one or more wireless headsets or telephones comprises usage characteristics or proximity information.

7. The method of claim 6, wherein the proximity information is determined by measuring strengths of signals received by the one or more wireless headsets or telephones.

8. The method of claim 6, wherein the proximity information is related to a proximity between the one or more wireless headsets or telephones and a near end user, related to the proximity between the one or more wireless headsets or telephones to the base station, or related to the proximity between the one or more wireless headsets or telephones to one or more known locations.

9. The method of claim 6, wherein the usage characteristics comprise whether the one or more wireless headsets or telephones are donned or doffed, are in a charging station, or are being carried but not worn.

10. The method of claim 1, wherein each of the one or more wireless headsets or wireless telephones comprises a motion detector.

11. The method of claim 10, wherein the motion detector includes a magnet and a coil moving relative to one another.

12. The method of claim 10, wherein the motion detector includes an acceleration sensor having a mass affixed to a piezoelectric crystal.

13. The method of claim 10, wherein the motion detector includes a light source, a photosensor, and a movable surface therebetween.

14. The method of claim 1, wherein each of the one or more wireless headsets or wireless telephones comprises one selected from the group consisting of an infra-red detector, a pyroelectric sensor, a capacitance circuit, a micro-switch, an inductive proximity switch, a skin resistance sensor, and at least two pyroelectric sensors for determining a difference in temperature readings from the two pyroelectric sensors.

15. A communication system comprising:
   one or more wireless headsets or wireless telephones;
   a telephone base coupled to a PSTN network comprising:
      a presence monitoring program adapted to receive and process presence information associated with the one or more wireless headsets or wireless telephones; and
      a caller interaction program for communicating a plurality of user selectable options associated with the presence information to a far end caller over the PSTN network and responsively receiving and processing a far end caller selected option.

16. The communication system of claim 15, wherein the one or more wireless headsets or wireless telephones comprise at least one member selected from the group consisting of: a first wireless handset associated with the telephone base, a second wireless handset associated with the telephone base, a first wireless headset associated with the telephone base, or a second wireless headset associated with the first wireless handset.

17. The communication system of claim 15, wherein the presence information comprises Don/Doff status and distance from the telephone base.

18. The communication system of claim 15, wherein the caller interaction program for communicating a plurality of user selectable options generates a plurality of voice prompts.

19. The communication system of claim 15, wherein receiving and processing a far end caller selected option comprises receiving a DTMF signal sent from the far end caller.

20. The communication system of claim 15, wherein the presence information associated with the one or more wireless headsets or wireless telephones comprises usage characteristics or proximity information.

21. The communication system of claim 20, wherein the proximity information is determined by measuring strengths of signals received by the one or more wireless headsets or wireless telephones.

22. The communication system of claim 20, wherein the proximity information is related to a proximity between the one or more wireless headsets or telephones and a near end user, related to the proximity between the one or more wireless headsets or telephones to the telephone base, or related to the proximity between the one or more wireless headsets or wireless telephones to one or more known locations.

23. The communication system of claim 20, wherein the usage characteristics comprise whether the one or more wireless headsets or wireless telephones are donned or doffed, are in a charging station, or are being carried but not worn.

24. The communication system of claim 15, wherein each of the one or more wireless headsets or wireless telephones comprises a motion detector.

25. The communication system of claim 10, wherein the motion detector comprises at least one member selected from the group consisting of: a magnet and a coil moving relative to one another, an acceleration sensor having a mass affixed to a piezoelectric crystal, and a light source, a photosensor, and a movable surface therebetween.

26. The communication system of claim 15, wherein each of the one or more wireless headsets or wireless telephones comprises at least one member one selected from the group consisting of: an infra-red detector, a pyroelectric sensor, a capacitance circuit, a micro-switch, an inductive proximity switch, a skin resistance sensor, and at least two pyroelectric sensors for determining a difference in temperature readings from the two pyroelectric sensors.

27. A communication system comprising:
one or more wireless headsets or wireless telephones;
a presence server coupled to a PSTN network comprising:
a presence monitoring program adapted to receive and process presence information associated with the one or more wireless headsets or wireless telephones; and
a caller interaction program for communicating a plurality of user selectable options associated with the presence information to a far end caller over the PSTN network and responsively receiving and processing a far end caller selected option.

28. The communication system of claim 27, wherein the presence server is adapted to manage and update a usage record associated with the one or more wireless headsets or telephones based on the presence information.

29. The communication system of claim 27, wherein the one or more wireless headsets or wireless telephones comprise at least one member selected from the group consisting of: a first wireless handset associated with the telephone base, a second wireless handset associated with the telephone base, a first wireless headset associated with the telephone base, or a second wireless headset associated with the first wireless handset.

30. The communication system of claim 27, wherein the presence information comprises don/doff status and distance from the presence server.

31. The communication system of claim 27, wherein the caller interaction program for communicating a plurality of user selectable options generates a plurality of voice prompts.

* * * * *